(12) United States Patent
McCollum et al.

(10) Patent No.: US 8,783,931 B2
(45) Date of Patent: Jul. 22, 2014

(54) LIGHT INJECTION SYSTEM AND METHOD FOR UNIFORM LUMINOSITY OF WAVEGUIDE-BASED DISPLAYS

(75) Inventors: Timothy A. McCollum, Avon Lake, OH (US); Fumitomo Hide, San Jose, CA (US); Martin G. Selbrede, The Woodlands, TX (US); Daniel K. Van Ostrand, The Woodlands, TX (US)

(73) Assignee: Rambus Delaware LLC, Brecksville, OH (US)

( * ) Notice: Subject to any disclaimer, the term of this patent is extended or adjusted under 35 U.S.C. 154(b) by 239 days.

(21) Appl. No.: 13/086,775

(22) Filed: Apr. 14, 2011

(65) Prior Publication Data
US 2011/0235365 A1  Sep. 29, 2011

Related U.S. Application Data

(63) Continuation-in-part of application No. 12/746,138, filed as application No. PCT/US2008/085442 on Dec. 3, 2008.

(60) Provisional application No. 60/992,080, filed on Dec. 3, 2007.

(51) Int. Cl.
*F21V 7/04* (2006.01)

(52) U.S. Cl.
USPC ........... 362/613; 362/602; 362/608; 362/611; 362/614; 362/622; 362/293; 362/294; 362/231; 362/621; 362/295

(58) Field of Classification Search
CPC ................ G02B 6/0068; G02B 6/0091; G02F 1/133615; G02F 1/133603
USPC ......... 362/602, 608, 610, 611, 612, 613, 614, 362/621, 622, 231, 293, 295, 394
See application file for complete search history.

(56) References Cited

U.S. PATENT DOCUMENTS

| 5,045,847 | A | | 9/1991 | Tarui et al. | |
|---|---|---|---|---|---|
| 5,319,491 | A | | 6/1994 | Selbrede | |
| 5,691,760 | A | * | 11/1997 | Hosier et al. | 347/238 |
| 7,204,631 | B2 | * | 4/2007 | Weber et al. | 362/609 |
| 7,461,962 | B2 | * | 12/2008 | Lee et al. | 362/613 |
| 7,934,863 | B2 | * | 5/2011 | Mori et al. | 362/612 |
| 8,029,180 | B2 | * | 10/2011 | Takahashi | 362/612 |
| 8,115,891 | B2 | * | 2/2012 | Ota | 349/70 |

(Continued)

FOREIGN PATENT DOCUMENTS

WO    2009073749 A1    6/2009

*Primary Examiner* — Thomas Sember
*Assistant Examiner* — Tsion Tumebo
(74) *Attorney, Agent, or Firm* — Renner, Otto, Boisselle & Sklar, LLP

(57) ABSTRACT

The attenuation of light per unit length in a waveguide as a result of active pixels (i.e., open pixels) may be corrected or mitigated by injecting apodized light into the waveguide. A light injection system and method is provided to enhance the luminous uniformity of the active pixels in a waveguide-based display. Embodiments of the present invention include a slab waveguide having a first edge and a second edge that intersect at a vertex, a first light source disposed along the first edge, and a second light source disposed along the second edge. The first light source, or the second light source, or both, comprises an apodized light source.

26 Claims, 11 Drawing Sheets

(56) References Cited

U.S. PATENT DOCUMENTS

| | | |
|---|---|---|
| 8,477,259 B2 * | 7/2013 | Kubota et al. ............... 349/65 |
| 2002/0169378 A1 | 11/2002 | Mo et al. |
| 2003/0043567 A1 * | 3/2003 | Hoelen et al. ............... 362/31 |
| 2005/0117190 A1 | 6/2005 | Iwauchi et al. |
| 2005/0264686 A1 | 12/2005 | Tenmyo |
| 2006/0291245 A1 | 12/2006 | Shimada |
| 2007/0242334 A1 | 10/2007 | Selbrede |
| 2008/0175023 A1 * | 7/2008 | Lee et al. .................. 362/613 |
| 2008/0192458 A1 | 8/2008 | Li |
| 2010/0072912 A1 * | 3/2010 | Wu et al. .................... 315/287 |
| 2011/0013423 A1 | 1/2011 | Selbrede et al. |
| 2014/0009965 A1 * | 1/2014 | Takase Kenji ............. 362/613 |

* cited by examiner

FIG. 1
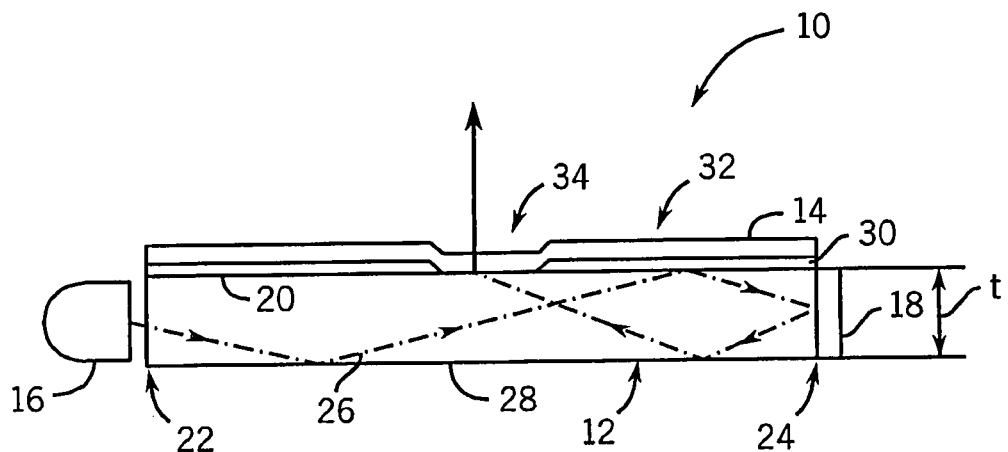
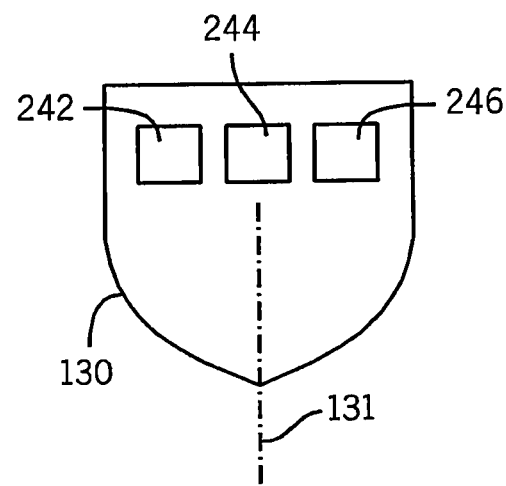
FIG. 9

| METHOD | EDGE 1 | EDGE 2 | EDGE 3 | EDGE 4 | LUMINOUS UNIFORMITY, THICK SLAB | LUMINOUS UNIFORMITY, THIN SLAB |
|---|---|---|---|---|---|---|
| 1 | UNIFORM LIGHT SOURCE | NONE | NONE | NONE | POOR | POOR |
| 2 | UNIFORM LIGHT SOURCE | NONE | UNIFORM LIGHT SOURCE | NONE | FAIR | FAIR |
| 3 | UNIFORM LIGHT SOURCE | NONE | REFLECTOR | NONE | EXCELLENT | FAIR |
| 4 | UNIFORM LIGHT SOURCE | UNIFORM LIGHT SOURCE | REFLECTOR | REFLECTOR | EXCELLENT | GOOD |
| 5 | UNIFORM LIGHT SOURCE | APODIZED LIGHT SOURCE | REFLECTOR | REFLECTOR | EXCELLENT | VERY GOOD |
| 6 | APODIZED LIGHT SOURCE | APODIZED LIGHT SOURCE | REFLECTOR | REFLECTOR | EXCELLENT | EXCELLENT |

FIG. 10

LIGHT INJECTION SYSTEM AND METHOD FOR UNIFORM LUMINOSITY OF WAVEGUIDE-BASED DISPLAYS

This application is a continuation-in-part of U.S. application Ser. No. 12/746,138, which is a national-phase entry of International Application No. PCT/US2008/085442, filed Dec. 3, 2008, and which claims priority U.S. Provisional Application No. 60/992,080, filed Dec. 3, 2007. All of the above applications are incorporated herein by reference.

BACKGROUND

This section is intended to introduce the reader to various aspects of art that may be related to aspects of the present technique, which are described and/or claimed below. This discussion is believed to be helpful in providing the reader with background information to facilitate a better understanding of the various aspects of the present technique. Accordingly, it should be understood that these statements are to be read in this light, and not as admissions of prior art.

Over the past decade, the demand for flat panel displays has increased significantly. Flat panel displays have been incorporated into computer monitors, televisions, cellular phones, personal digital assistants (PDA's), instrumentation, monitoring devices, and the like. Flat panel displays include liquid crystal displays (LCDs), organic light emitting diode (OLED) displays, and liquid plasma displays. However, existing flat panel displays generally have one or more undesirable characteristics, such as unsatisfactory image quality, high power consumption, low light output, display size constraints, and incompatibility with certain environmental conditions.

Existing flat panel displays generally include brightness enhancing films, antireflective layers, polarizers, color filters, absorptive layers, and many other layers. These layers undesirably add to the cost, complexity, and thickness of the flat panel displays, while often drastically reducing the light output of the display. As a result, existing flat panel displays are not particularly energy efficient.

Flat panel displays also commonly employ a spatial additive color technique, which adversely limits the resolution of the display. In general, the resolution of flat panel displays is characterized by the horizontal and vertical number of pixels. In the spatial additive color technique, each pixel includes a group of differently colored cells (e.g., red, green, and blue) arranged in close proximity to one another. Due to the close proximity, the group of differently colored cells is perceived by the eye as a single color. The use of multiple cells per pixel undesirably increases the cost and complexity of the flat panel display, while also limiting the resolution of the display.

The distribution of light from the light source affects the image quality expelled from the flat panel display. Flat panel displays, particularly LCD displays, typically have either an edge light or a backlight as the light source. One challenge of edge injection of light is the variation in the light intensity across the waveguide from one edge to another of the display. The nonuniformity in light intensity emitted or transmitted from pixels (i.e., luminosity) across the surface of the waveguide generally worsens with increasing display or screen size. In addition, luminosity across the waveguide is further degraded as a result of open pixels located closer to the edge light source which emit light and, consequently, deplete the light within the waveguide available to open pixels further away from the edge light source. To circumvent such challenges, large LCD displays generally inject light from behind the display rather than from the edge, however among other drawbacks, the backlight undesirably adds to the overall thickness of the display. In plasma displays, the light originates from many tiny cells of an inert mixture of noble gases (e.g., neon and xenon) between two panels of glass. The cells emit light upon electrically turning the gas into plasma which, in turn, acts upon phosphors to emit photons. Current challenges of plasma displays are that they are particularly heavy, energy inefficient, and subject to decreasing luminosity with use.

Flat panel displays that employ a transparent slab waveguide for directing light to a plurality of pixel shuttering mechanisms can provide quality images while exhibiting high efficiency, low power consumption, and a thin form factor. In these waveguide systems, light is injected from an edge of the waveguide (edge-injected) to provide a light-recycling backlight and/or to supply light that is directed to pixels located near the display surface of the waveguide. For example, edge-injected light may be directed to the display surface by the pixel shuttering mechanisms. Thus, light generated in a light source is distributed into the waveguide, and then expelled from the waveguide at a pixel location on a surface of the waveguide. To provide a uniform image it is desirable that light injected into the waveguide remain uniform across the waveguide such that the light intensity of the light expelled at each active or open pixel (i.e., "on" pixel) location is uniform. This may be referred to as having a high luminous uniformity. In some implementations edge-injected light may not be uniformly distributed within the waveguide and/or light depletion due to open pixels may cause light nonuniformity within the waveguide, resulting in a low luminous uniformity and, thereby, images that do not exhibit uniform intensity, color, brightness, and the like. Furthermore, achieving high luminous uniformity becomes increasingly more difficult as the thickness of the flat panel display, and, thus, the thickness of the waveguide decreases. It would be an improvement in the art to provide a light injection system and method that enhances luminous uniformity throughout a waveguide regardless of panel size (length× width) and thickness. The trend towards thinner panels can then be accommodated without undue degradation of luminous uniformity of the images displayed thereon.

SUMMARY OF THE INVENTION

Certain aspects commensurate in scope with the disclosure are set forth below. It should be understood that these aspects are presented merely to provide the reader with a brief summary of certain forms the disclosure might take and that these aspects are not intended to limit the scope of the disclosure. Indeed, the disclosure may encompass a variety of aspects that may not be set forth below.

In accordance with various embodiments, provided is a light system that includes a slab waveguide having a first edge and a second edge that intersect at a vertex, a first light source disposed along the first edge, and a second light source disposed along the second edge.

In accordance with various embodiments, provided is a light system that includes a first illumination array configured to mount along a first edge of a slab waveguide and a second illumination array configured to mount along a second edge of the slab waveguide. The first illumination array comprises a first plurality of light sources and the second illumination array comprises a second plurality of light sources. The first and second illumination arrays are transverse to one another in directions that generally intersect at the vertex. Constituent lights of the first plurality of light sources, the second plurality of light sources, or a combination thereof, are spaced at varying distances.

In accordance with various embodiments, provided is a method that includes edge injecting light into a first edge of a waveguide, and edge injecting light into a second edge of a waveguide.

In accordance with various embodiments, provided is a light system including a slab waveguide and a light source configured to edge inject light into the slab waveguide, wherein the light source comprises an apodized light source.

In accordance with various embodiments, provided is method that includes edge injecting light into an edge of a slab waveguide, wherein the light comprises an apodization gradient that varies along the edge.

In accordance with various embodiments, provided is a method of edge injecting light into a waveguide including dynamically adjusting a profile of light intensity, wherein dynamically adjusting the profile is configured to compensate for light depletion in the waveguide.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 1 illustrates a side view of a flat panel display system employing a waveguide in accordance with certain embodiments of the present technique;

FIG. 9 illustrates a detailed view of a constituent light source in accordance with certain embodiments of the present technique;

FIG. 10 is a table that depicts results in accordance with certain embodiments of the present technique;

DETAILED DESCRIPTION

Figure 2:
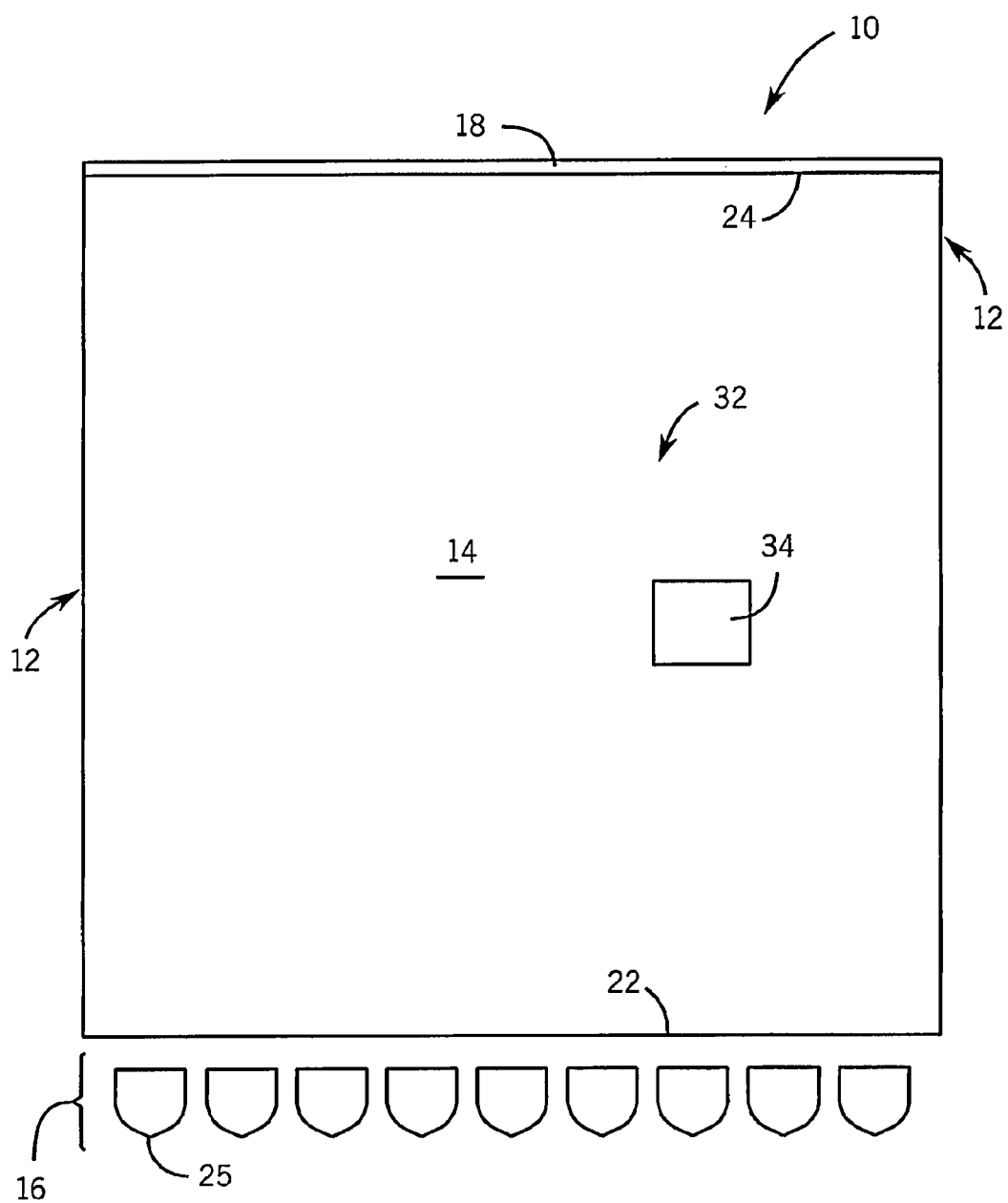
FIG. 2 illustrates a top view of the flat panel display system of FIG. 1 in accordance with certain embodiments of the present technique.

One or more specific embodiments of the present technique will be described below. These described embodiments are only exemplary of the present technique. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, the following discloses a waveguide system that is configured to deliver high luminous uniformity across a relatively thin flat panel display. The system generally includes a rectangular waveguide and a light source that edge injects light into the waveguide. In certain embodiments, the light source includes an apodized light source. Further, in some embodiments, the system includes a rectangular waveguide having companion light sources (e.g., a primary light source and a supplemental light source) disposed along two adjacent edges of the rectangular waveguide, respectively. In one embodiment, both of the light sources are configured to provide light having a uniform (e.g., isotropic) flux per unit length along the adjacent edges. It should be noted that the "uniform flux" or "isotropic flux" per unit length hereinafter referred to is actually an averaged uniform flux due to the point light sources (e.g., LEDs) involved. In another embodiment, at least one of the light sources may be configured to provide light having a non-uniform (e.g., apodized) flux gradient along the length of at least one of the adjacent edges. In certain embodiments, each of the light sources may include a plurality of constituent light sources that are disposed along the length of the adjacent edges. In some embodiments, such as those in which the light source is configured to provide an isotropic flux, each of the constituent light sources may be spaced an equidistance from one another and generate light at similar intensities. In other embodiments, such as those in which the light source is configured to provide an apodized flux, the constituent light sources may not be equally spaced from one another, the intensity of the light emitted by each constituent light source may be varied, the duty-cycle of each of the constituent light sources may be varied, a filter may be employed, and/or a single constituent light source and a light conduit may be employed. In certain embodiments, the above mentioned techniques may be employed to one or both of the adjacent edges. Further, the above discussed techniques may be employed to provide apodized light that varies in intensity as a function (i.e., linear or nonlinear function) of the distance from a vertex of the adjacent edges or as a function of pixel efficiency. Prior to discussing the embodiments in detail, it may be helpful to discuss operation of a flat panel display system that may employ such a waveguide system.

The disclosed embodiments may be incorporated into a flat panel display having Time Multiplexed Optical Shutter (TMOS) devices. The fundamental premise of such devices is that light (usually monochromatic light) is edge-injected into a transparent rectangular slab waveguide such that total internal reflection of the injected light is obtained within the slab. For example, the slab waveguide may be mirrored on one or more of the side surfaces to insure maximum transits for rays traveling within the slab waveguide. Thus, light injected into the slab waveguide may be internally reflected until the internal reflection is frustrated and the light escapes the slab waveguide (e.g., at an activated pixel).

In flat panel display systems, including those disclosed below, the waveguide generally includes a display surface that is configured to pass light at various locations along the display surface. Each of these locations may be referred to as a pixel of the displayed image, and the plurality of pixels may be located across the surface of the display surface of the waveguide to generate one or more images. The principle of operation for any of the plurality of pixels distributed across the slab waveguide involves locally, selectively, and controllably frustrating the total internal reflection of light bound within the slab waveguide. For example, in TMOS flat panel display systems the total internal reflection may be frustrated by propelling an optically-suitable material such that the optical material is in contact or in near-contact with the slab waveguide. In some display systems, this may include disposing the optical material proximate the display surface such that a microscopic gap exists between the optical material and the display surface of the slab waveguide. An active pixel location generally includes the optical material disposed in contact or in near-contact with the display surface of the waveguide such that internal reflection is frustrated at the pixel location and light is capable of being directed out of the waveguide at the pixel location. In contrast, an inactive pixel generally includes optical material that is sufficiently displaced from (i.e., not in contact or not in near-contact with) the display surface of the slab waveguide, such that evanescent coupling across the gap is negligible, and light is not directed out of the display surface of the waveguide, but is instead internally reflected into the waveguide.

FIGS. 1 and 2 illustrate a flat panel display system 10 that may employ at least one of the previously discussed techniques. In the illustrated embodiment, the flat panel display system 10 includes a waveguide 12, an optical material 14, a light source 16, and a reflective element 18. The optical material 14 is disposed proximate a display (top) surface 20 of the waveguide 12, the light source 16 is disposed proximate an injection edge 22 of the waveguide 12, and the reflective element 18 is disposed proximate a far edge 24 that is opposite the injection edge 22. The light source 16 may be air-coupled to the injection edge 22 of the waveguide 12. As illustrated, the light source 16 includes one or more constituent light sources 25, in some embodiments. In operation, light is emitted from the light source 16, injected into the waveguide 12 at the injection edge 22, and internally reflected within the waveguide 12, as illustrated by light path 26. For example, in the illustrated embodiment, the light path 26 reflects off of a bottom surface 28 of the waveguide 12, the top surface 20 of the waveguide 12, and the reflective element 18. In some embodiments, the far edge 24 may include a reflective/mirrored surface or element that promotes the reflection of light back into the waveguide 12.

As depicted, the light may be reflected by or passed through the top surface 20 of the waveguide 12. Manipulating a boundary condition (e.g., the mechanical arrangement and spacing of adjacent transparent regions of specific refractive index values) at portions of the top surface 20, may cause light to either reflect back into the waveguide 12 or may direct the light out of the waveguide 12 toward the viewer. In other words, by mechanical rearrangement, incident light encounters a different sequence of refractive index materials (e.g., at the top surface 20) that determine the light's subsequent trajectory at that interface. In the depicted embodiment, the boundary condition at the top surface 20 can be selectively manipulated at a plurality of localized regions (i.e., pixel locations) by moving the position/state of the optical material 14 into and out of contact (or near contact) with the top surface 20. For example, where a microscopic gap 30 exists between the optical material 14 and the top surface 20 of the waveguide 12, the lower refractive index of air causes the light that strikes the top surface 20 of the waveguide 12 to internally reflect towards the interior of the waveguide provided the gap 30 is sufficiently large (typically on the order of one wavelength of light). This may be referred to as an inactive region or inactive pixel location, generally indicated by reference numeral 32. However, where the microscopic gap 30 is reduced and/or eliminated and the optical material 14 is near or in contact with the top surface 20, the index of refraction (equal to or greater than the refractive index of the waveguide material) the light rays encounter at the boundary of the top surface 20 is modified, thereby causing the light to be directed out of waveguide 12. This may be referred to as an active region or an active pixel location, generally indicated by reference numeral 34. In other words, the optical material 14 may be selectively brought into contact or near contact (i.e., very close proximity) to the top surface 20 of the waveguide 12 to frustrate the total internal reflection at or near the active region 34, thereby locally directing light out of the waveguide 12. As illustrated in the depicted embodiment, where light following path 26 strikes the inactive region 32 the light is reflected into the interior of the waveguide 20. However, where path 26 strikes the active region 34 (i.e., an active pixel) light is directed out of the waveguide 12.

To construct an image, a plurality of inactive and active regions 32 and 34 may be employed simultaneously and in coordination to emit light from the top surface 20 of the waveguide 12. In such a system, the flat panel display comprises a plurality of pixels, such as a grid of pixels that represent discrete subsections of the display, that can be individually and selectively controlled to switch between active (on) and inactive (off) states. The speed of switching can be quite rapid, to permit generation of full motion color video content using, for example, pulse width modulation gray scale creation applied to field sequential color generation techniques, which are both well known in the art of flat panel display design and manufacturing.

The optical material 14 is generally disposed over the top surface 20 of the waveguide 12 and may include a configuration and material that is conducive to controllably directing light out of the waveguide 12. For example, the optical material 14 can include a contiguous thin film sheet of polymeric material preferably having an array of microlenslets. The optical material 14 has a refractive index selected to optimize the coupling of light during the contact/near-contact events that can occur at very high speeds. This may permit the generation of adequate gray scale levels for multiple primary colors at video frame rates and help to avoid excessive motional and color breakup artifacts in the image, thereby helping to preserve smooth image and video generation.

Propulsion of the optical material 14 can be achieved by the electromechanical and/or ponderomotive deformation of a contiguous thin sheet of the optical material 14. In certain embodiments, the optical material 14 may be tethered at the periphery of an individual pixel geometry by standoffs that maintain the optical material 14 in a suitable spaced-apart relation to the slab waveguide 12 when the pixel is in the quiescent unactuated state (e.g., inactive position). For example, application of an appropriate electrical potential across the gap 30 with conductors associated with the slab waveguide 12 and the optical material 14 to be propelled/deformed, may cause high-speed motion of the optical material 14 toward the slab waveguide 12. Actuation may be deemed completed when the optical material 14 can move no closer to the slab waveguide 12. Movement of the optical material 14 may be limited by the inability of the optical material 14 to deform any further and/or may be limited due to physical contact with the slab waveguide 12, for instance.

Certain display systems employing the waveguide 12 may use similar (but not identical) principles of operation. For instance, some systems may utilize a backlight system where the pixels literally shutter light, e.g., by transverse lateral motion of an opaque Micro Electrical Mechanical Systems (MEMS) based shuttering element located at each pixel and parallel to the main surface of the waveguide 12. In a backlight system, light within the slab waveguide 12 may not be maintained in a Total Internal Reflection (TIR) compliant state lest it be perpetually bound to the interior of the waveguide 12. Thus, the bottom surface 28 of the waveguide 12 can include a scattering surface, or may diverge from a parallel spaced-apart relation to the top surface 20 of the waveguide 12, or both, to insure that light continually departs the top surface 20 of the slab waveguide 12. The departing light may illuminate the pixel shutter mechanisms (such as the optical material 14) arrayed at or above the top surface 20 of the slab waveguide 12. Employing a slab waveguide 12 for transverse MEMS shutter based systems may enable recycling of unused light by configuring the waveguide-facing portions of the shutter mechanisms to be nominally reflective, and, thus, light not passing through an open shutter may then re-enter the waveguide 12 and be used elsewhere within the system. As illustrated in FIG. 1, in some devices the light sources 16 may be disposed on one injection edge 22 of the slab waveguide 12 while the far edge 24 from the injection edge 22 is mirrored either with a metallic reflector disposed thereon or by imposition of a perfect dielectric mirror to gain even better reflectance. As discussed above, the reflective nature of a device located at the opposing edge may promote the internal reflection and recycling of unused light within the waveguide 12.

The light that is injected into the waveguide is generally consumed at the active pixel locations that direct at least a portion of the light out of the waveguide. The consumption of light, whether imparted by an active pixel location or another consuming device or location, is generally referred to as light depletion. In a typical waveguide system, active pixels cause a substantial amount of light depletion, and, thus, the light depletion effect is generally proportional to the number of active pixels ("on" pixels) at any given time and their individual efficiency at frustrating total internal reflection. In other words, light depletion increases as the number of active pixels on the display surface increases. Without suitable compensation means, the light depletion can contribute to potentially significant non-uniform luminosity in the waveguide.

Further, it has been determined that the luminous uniformity of the light display (i.e., uniformity of light intensity emitted from all open pixels across the waveguide) may be dependent on a thickness (t) of the slab waveguide 12. In general, as the thickness of the slab waveguide 12 decreases, so does the luminous uniformity. In other words, as the flat panel display decreases in thickness, and, thus, the thickness of the waveguide 12 decreases, the decrease in the distance between the top surface 20 and the bottom surface 28 increases the number of times a path of light strikes the top surface 20, thereby, increasing the light depletion at active pixel locations and the overall light depletion effect. The minimum thickness (t) that can be utilized for the slab waveguide 12 while maintaining a suitable luminous uniformity is a function of the length of the waveguide (l), the critical angle of the waveguide θc (which is a function of the refractive index of the waveguide 12), and the individual optical efficiency of a pixel on the display surface, denoted $\in$. The mean free path of a given photon ensemble from origin at the light source to 99% depletion inside the waveguide 12 is given the Greek symbol λ, which is not to be confused with the optical wavelength of that light in this context. By detuning the effective individual pixel efficiency $\in$, and using the resulting average mean free path of a photon ensemble prior to 99% depletion, λ, uniformity has been demonstrated to be readily optimized when λ=3l or greater, thereby setting a lower bound on slab thickness (t) according to the following equation:

$$t = \frac{3 - \left(\frac{\log(0.01)}{\log(1-\varepsilon)}\right)l}{\left(\frac{\cos(\theta_c)\log(0.01)}{\log(1-\varepsilon)}\right)}$$

Applying this constraint to determine the minimum slab thickness (t), hereinafter also referred to as the uniformity threshold thickness (t), enables displays employing waveguides 12 to achieve in excess of 60% optical efficiency (ratio of light flux input to light flux output) while simultaneously insuring far less than 1 dB variation in luminosity across the entire display surface (typically under 0.2 dB variation). Although this constraint is of minimal consequence for many applications, it does present a hurdle for applications where the industry trend has been toward thinner display subsystems. For example, the thickness constraint for a given geometry may suggest that the waveguide 12 have a minimum thickness of 2 millimeters to provide a suitable luminous uniformity, and, in contrast, the trend in cell phone display components may suggests that the display have a maximum total thickness of about 1 mm. For example, a waveguide thickness of 0.7 mm may be desirable, given that this is a standard thickness for LCD mother glass and Thin Film Transistor (TFT) active matrix glass. However, in the previously discussed example (e.g., a minimum thickness of 2 mm) the waveguide 12 may violate the thickness constraint outlined above, and, thereby, incur debilitating light nonuniformities in brightness and intensity across the waveguide 12 and the display surface. Accordingly, the symbol t shall hereafter be denominated the uniformity threshold limit that defines the minimum thickness (t) of the waveguide 12.

In certain embodiments, the specific display technology to be enhanced is an iteration of the display technology originally disclosed in "Optical Display" U.S. Pat. No. 5,319,491 filed Aug. 10, 1990, which is incorporated herein by reference in its entirety. Similar to the techniques discussed previously, the system of the '491 patent includes pixels that emit light using the principle of frustrated total internal reflection within a display architecture that leverages the principles of field sequential color generation and pulse width modulated gray scale creation. In that display system, light is edge-injected into a planar slab waveguide and undergoes total internal reflection within the guide, trapping the light inside it (due to reflective coatings on the slab edge farthest from the light source injection edge, and total internal reflection on the other edges by virtue of air-coupling of the light sources to the waveguide, wherein the waveguide material has a refractive index higher than the square root of two, namely, 1.4142). Pixels are electrostatically controlled MEMS structures that propel an elastomeric high refractive index thin film layer (e.g., an Active Layer, which is controllably deformable) across a microscopic gap (measuring between 450 to 1000 nanometers) into contact or near-contact with the waveguide, at which point light transits across from the waveguide to the thin film layer either by direct contact propagation and/or by way of evanescent coupling.

Further, the techniques disclosed below can be applied to displays where the pixels modulate light by way of local and selective Frustration of Total Internal Reflection (FTIR) of light traveling inside the waveguide, and to displays that use conventional MEMS shuttering of light emitted from the backlight structure where light recycling native to FTIR displays is adopted to improve efficiency and uniformity of the display system. Embodiments of the present technique may be suitable for both types of displays, and may be compatible with various gray scale and color generation methods (e.g., pulse width modulated gray scales, field sequential color, analog color generation, color filtration methods, etc.). Among many other areas of potential application, the disclosed techniques may enhance the flat panel display system disclosed in U.S. Pat. No. 5,319,491 entitled "Optical Display", and U.S. Pat. No. 7,092,142 entitled "Air Gap Autogenesis Method", and their related applications. Further, the range of applicability of embodiments of the present technique are not limited to direct view systems such as flat panel displays, but can also be employed in projection-based display technologies.

In one embodiment of the present technique, the thickness of the slab waveguide 12 can be reduced below the uniformity threshold thickness limit (t) by edge injecting light in a manner to account for light depletion across the waveguide 12. For example, the intensity of the light injected into the waveguide 12 is adjusted or varied to compensate for light depleted by active pixels. A light source that employs such a technique and or includes a variation of light intensity along its length may be referred to as an apodized light source. The process of adjusting and/or varying the intensity of the injected light, for example by adjusting and/or varying the intensity of the light source, may be termed apodization. As is discussed in further detail below with regard to FIGS. 3-10, apodization can be achieved in various manners and employed to compensate for the variation in light flux within a slab waveguide 102 having a thickness below the uniformity threshold thickness limit (t). For example, apodization may be applied to light sources 16 disposed on one or more edges of the waveguide 12. Further, apodization of the light source may be achieved by a variety of manners, including, but not limited to varying the spacing of constituent light sources, varying the intensity of the constituent light sources, varying the duty cycle of the constituent light sources, varying the filtering, and the use of a conduit, as discussed below with regard to FIGS. 4-8.

In one embodiment of the present technique, the light source 16 includes an apodized light source that is configured inject light into the waveguide 12 with varying intensities. In other words, one portion (e.g., constituent light source 25) of the light source 16 may inject light at a different intensity than another portion of the light source 16. For example, in one embodiment, a portion of the light source 16 near the center of the injection edge 22 may output a light of a higher intensity than the light output by a portion of the light source 16 near the end of the injection edge 22, thereby providing a higher intensity proximate the center of the edge 22. Other embodiments may include variations in the light intensity of the light source to provide a profile of light intensity (e.g., an apodization gradient) along the light source 16 that helps to account for the light depletion. For example, one embodiment may include an apodization gradient that includes higher intensities near the ends of the injection edge 22.

The apodization gradient may be based on the characteristics of the display, and or the image to be displayed. For example, in one embodiment, the apodization gradient is configured to account for one or more scenarios including a substantial amount of active pixels 34. In another embodiment, the apodization gradient is configured to account for one or more scenarios including a substantial amount of inactive pixels 32. Further, during operation, the waveguide system 10 may employ a single apodization gradient, or the waveguide system 10 may employ a plurality of apodization gradients based on one or more conditions associated with the waveguide system 10 (e.g., the display). For example, in one embodiment, the apodization gradient may include a predetermined configuration that is employed by the waveguide system 10 and that is not changed during operation. This may be referred to as static apodization. For example, in one embodiment, the waveguide system 10 includes the light source exhibiting a single apodization gradient that does not change during operation. The apodization gradient may include intensities that optimize the luminous uniformity in one configuration of the waveguide system 10.

In another embodiment, the apodization gradient may vary during the operation. This may be referred to as dynamic apodization. For example, in one embodiment, dynamic apodization includes varying the apodization gradient in relation to one or more aspects of the waveguide system 10. For example, in one embodiment, the apodization gradient is varied based on the displayed image or soon to be displayed image. In such an embodiment, the apodization gradient is varied as a function of the instantaneous number of active regions 34, for instance.

In one embodiment, the apodization may be determined based on the pixels that are active or inactive. Such a technique may include multivariant minimization to determine coefficients associated with the apodization to control the variations in uniformity. In static apodization, a single set of coefficients may be determined (e.g., a set corresponding to the best uniformity for general images displayed) and maintained. In dynamic apodization, the analysis may be performed in real-time to continuously update and implement varying sets of the coefficients.

Although the previous discussion has discussed apodization of the single light source 16, in other embodiments, the thickness of the slab waveguide 12 can be reduced below the uniformity threshold thickness limit (t) by employing more than one light source. In some embodiments, neither of the light sources is apodized, however, in other embodiments, one or both of the light sources are apodized. For example, in one embodiment, the thickness of the slab waveguide 12 can be reduced below the uniformity threshold thickness limit (t) by configuring a set of companion light sources (hereafter referred to as the primary light source and the supplemental light source) along adjacent edges of the slab waveguide 12. The superposition of the two luminosity distributions (the summation of the flux distributions from both the primary and the supplemental light sources) may exhibit a desirable flux distribution. For example, in one embodiment, both the primary and supplemental light sources are configured with an array of equidistant light sources to provide enhanced luminous uniformity across the surface of the waveguide. It should be noted that in such an embodiment, reflectors are preferably placed on the two opposite edges of the waveguide 12, which remains true for all subsequent embodiments discussed herein.

Figure 3:
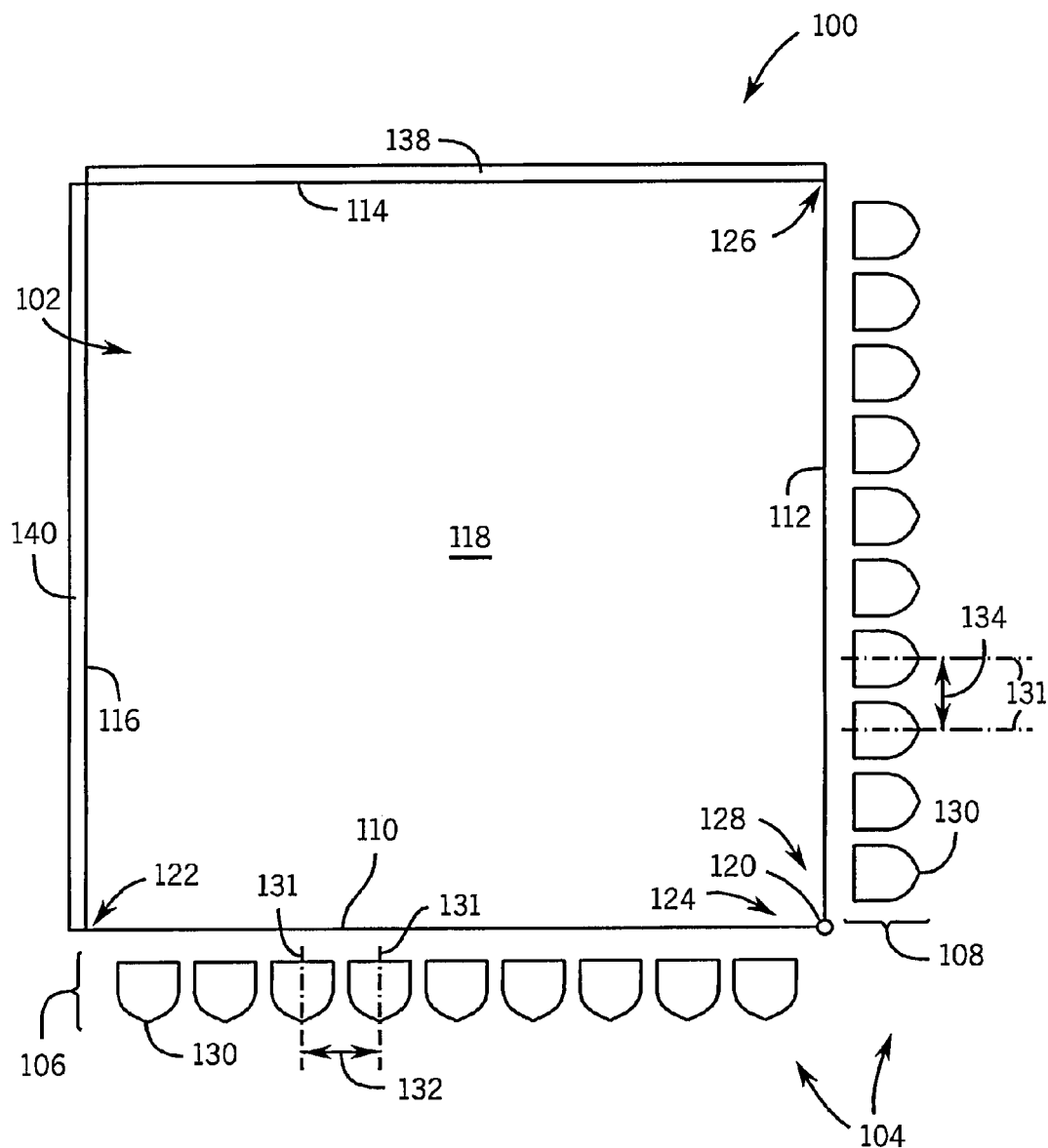
FIG. 3 illustrates a top view of a flat panel display system employing companion light sources in accordance with certain embodiments of the present technique.

FIG. 3 depicts a top view of a waveguide system 100 in accordance with such an embodiment of the present technique. In the illustrated embodiment, the waveguide system 100 includes a waveguide 102 and companion light sources 104. The companion light sources 104 include a primary light source 106 and a supplemental secondary light source 108 disposed along adjacent edges of the waveguide 102, respectively.

In one embodiment, the waveguide 102 may include a transparent rectangular slab waveguide 102. For example, in the illustrated embodiment, the waveguide 102 includes a generally rectangular shape having a first edge 110, a second edge 112, a third edge 114, and a fourth edge 116. As depicted, the third edge 114 is opposite from the first edge 110 and the fourth edge 116 is opposite from the second edge 112. Light may be edge-injected into the waveguide 102 from one or more light sources disposed near one or more of the edges 110, 112, 114, and 116 of the waveguide 102. For example, light may be edge-injected from one or both of the companion light sources 104 located along at least a portion of the first edge 110 and at least a portion of the second edge 112. Similar to the discussion regarding FIGS. 1 and 2, the injected light may be internally reflected in the waveguide 102 or directed out of the waveguide 102 via a top surface 118 at one or more pixel locations of the waveguide 102.

In the illustrated embodiment, the companion light sources 104 include the primary light source 106 and the supplemental secondary light source 108 along adjacent edges 110 and 112 of the waveguide 102, respectively. Here, adjacent edges may be defined as edges that intersect one another at a vertex. For example, in the illustrated embodiment, the first edge 110 and the second edge 112 are adjacent to one another and intersect one another at a vertex 120. Accordingly, the primary light source 106 is disposed along at least a portion of the first edge 110 and the supplemental light source 108 is disposed along at least a portion of the second edge 112 adjacent the first edge 110.

In some embodiments, the primary light source 106 may extend along the entire length of the first edge 110 or only a portion of the first edge 110. For example, in the illustrated embodiment, the primary light source 106 extends across the majority of the distance between a distal end 122 and a proximal end 124 of the first edge 110. The proximal end 124 includes the end near the vertex 120, and the distal end 122 is an opposite end of the first edge 110 that is located farther away from the vertex 120. In other embodiments, the primary light source 106 may extend along only a portion of the first edge 110. For example, the primary light source 106 may be located near the distal end 122 or the proximal end 124.

Similarly, the supplemental light source 108 may extend along the entire length of the second edge 112 or only a portion of the second edge 112. For example, in the illustrated embodiment, the secondary light source 108 extends across the majority of the distance between a distal end 126 and a proximal end 128 of the second edge 112. The proximal end 128 is the end of the second edge 112 near or proximate the vertex 120 and the distal end 126 is an opposite end of the second edge 112 that is located farther away from the vertex 120. In other embodiments, the secondary light source 108 may extend along only a portion of the second edge 112. For example, the secondary light source 108 may be located proximate the distal end 126 or the proximal end 128.

In one embodiment, the companion light sources 104 may be configured to provide an isotropic flux per unit length of the edges 110 and 112. In other words, the companion light sources may be configured to provide a uniform light flux distribution along the length of the edges 110 and 112. For example, in the illustrated embodiment, the primary light source 106 and the supplemental light source 108 include a plurality of constituent light source packages 130 that are spaced at equal distances from one another to provide a generally constant light flux and luminosity across the length and width of the waveguide 102. Equal distance may be defined as having equal spacing between a centerline 131 of each of the constituent light source package 130, or between any reference points that provide for a uniform spacing between each of the light source packages 130. More specifically, in one embodiment, each of the primary light source 106 and the supplemental light source 108 include a one dimensional array (e.g., illumination array) of the constituent light sources 130 that are equally spaced from one another (e.g., equally spaced centerline 131 to centerline 131). For example, in the illustrated embodiment, the constituent light sources 130 of the primary light source 106 are each spaced equally by a first distance 132, and each the constituent light sources 130 of the secondary light source 108 are spaced equally by a second distance 134. In the illustrated embodiment, the first distance 132 and the second distance 134 are equivalent. However, in other embodiments, the first distance 132 and the second distance 134 may be different. Further, it is noted that in the illustrated embodiment, the primary light source 106 and the secondary light source 108 each includes an array of constituent light sources 130. However, other embodiments may include alternate configurations, including more or fewer constituent light sources 130, and/or different arrangements, such as a two dimensional array of constituent light sources 130.

The third edge 114 and the fourth edge 116 may be configured to promote internal reflection of the light generated by the companion light sources 104. For example, in the illustrated embodiment, a first reflective device 138 is disposed proximate the third edge 114, and a second reflective device 140 is disposed proximate the fourth edge 116. In one embodiment, the reflective devices 138 and 140 may include mirrors coupled to and/or disposed on the third and fourth edges 114 and 116, respectively, and configured to reflect light into the waveguide 102. In operation, light generated by the primary light source 106 may be injected into the waveguide 102 at the first edge 110, pass through the interior of the waveguide 102, strike the third edge 114 and be reflected back towards the interior of the waveguide 102 by the first reflective device 138. Similarly, light generated by the secondary light source 108 may be injected into the waveguide 102 at the second edge 112, pass through the interior of the waveguide 102, strike the fourth edge 116 and be reflected back towards the interior of the waveguide 102 by the second reflective device 140. Other embodiments may include similar devices or coatings proximate the edges 114, and/or 116 and configured to promote reflection of the light toward the interior of the waveguide 102. Still other embodiments may also include similar devices or coating proximate edges 110 and/or 112, such as apertured reflector coatings, that allow the injection of light while promoting reflection of light toward the interior of the waveguide 102.

In one embodiment, the spacing of the constituent light sources 130 may be varied in at least one of the primary and supplemental light sources 106 and 108 to provide apodized light, as discussed above with regard to FIG. 2. In other words, the constituent light sources 130 of at least one of the companion light sources 104 may not be disposed equidistant from one another and/or not configured to provide an isotropic flux distribution. Rather, the spacing between the constituent light sources 130 of one of the companion light sources 104 may be varied over the length of the first edge 110 or the second edge 112 and/or the characteristics of the injected light may be modified to provide apodized light. Generally, light sources, such as light sources 130, may exhibit an intensity dependent power efficiency such that adjustment of the spacing of the light sources may preserve optimal power efficiency. In one embodiment, the distance between the constituent light sources 130 may be greater at the proximal end 124 or 128 of the first edge 110 or second edge 112, respectfully, and the distance between the constituent light sources 130 may be less at the distal end 122 or 126 of the first edge 110 or the second edge 112, respectfully. The variation in spacing may be employed to vary the intensity of the light injected along the length of an edge, thereby providing apodized injected light.

Figure 4:
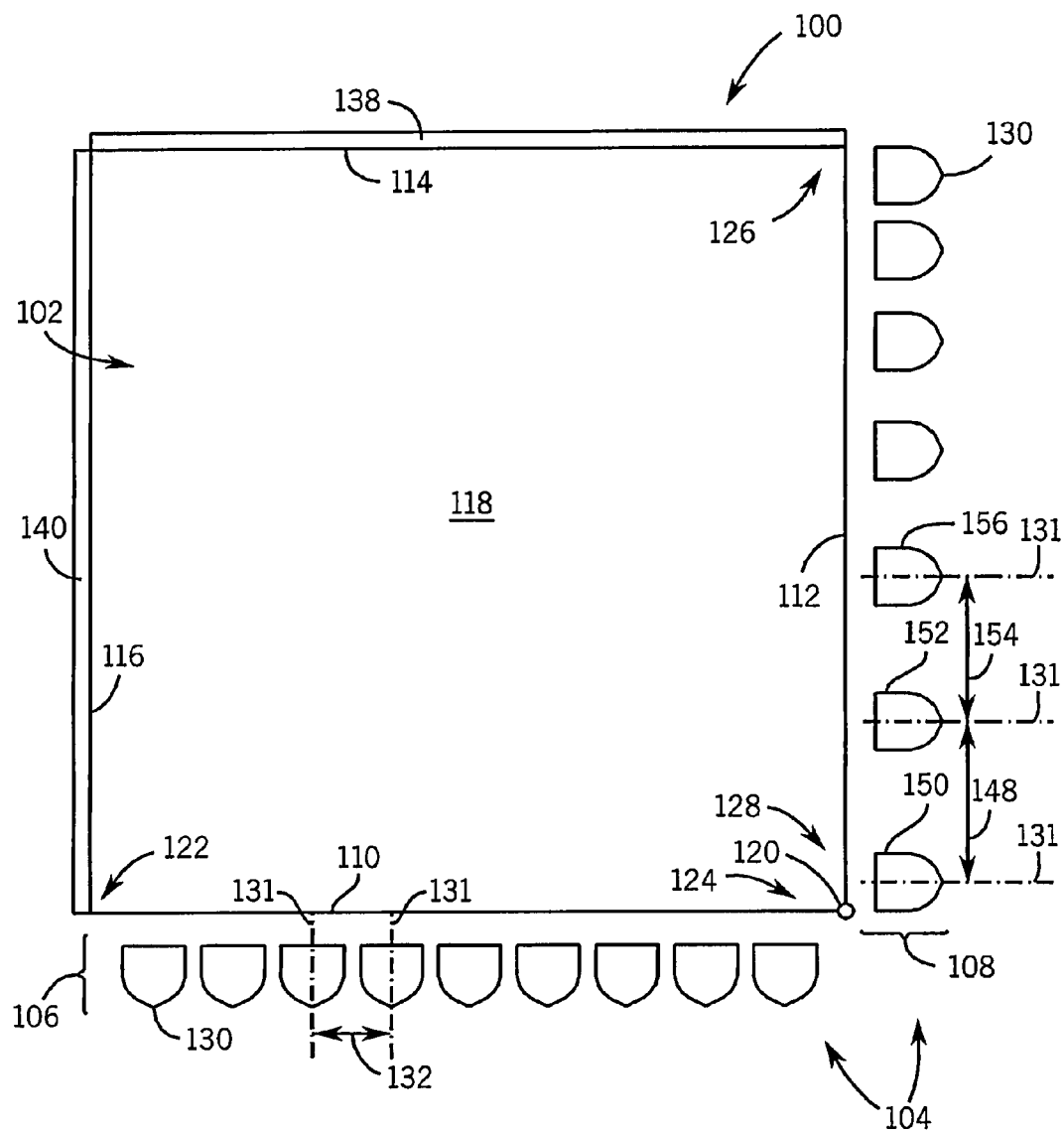
FIG. 4 illustrates a top view of a flat panel display system employing one apodized companion light source in accordance with certain embodiments of the present technique.

FIG. 4 illustrates an alternate embodiment of the system 100 that includes an apodized light source disposed along the second edge 112. In the illustrated embodiment, the distance between the constituent light sources 130 is reduced along the length of the second edge 112 from the vertex 120 to the distal end 126. Similar to the previous discussions, the distance between the constituent light sources 130 is defined as the distance between the centerlines 131 of the constituent light sources 130, in one embodiment. For example, a first distance 148 between a first constituent light source 150 (located proximate the proximal end 128 of the second edge 112) and a second constituent light source 152 is greater than or equal to a second distance 154 between the second constituent light source 152 and a third constituent light source 156 (that is closer to the distal end 126 of the second edge 112). As illustrated the distance between each successive pair of constituent light sources 130 is equal to or less than the distance between the previous pair of constituent light sources 130 located closer to the proximal end 128 and/or the vertex 120. This technique may be referred to as spatially redistributing the individual constituent light sources 130 of the supplemental light source 108. In an embodiment in which the spacing between the constituent light sources 130 is varied along the length of the supplemental light source 108, the optical flux entering the waveguide 102 from the second edge 112 (flux which is predominantly orthogonal to the flux entering through the first edge 110) may not be spatially isotropic, but may exhibit a gradient of intensity (e.g., an apodization gradient) where the lowest intensity enters the waveguide 102 near the vertex 120 or corner where companion light sources 104 meet, and the highest intensity may enter the waveguide 102 at or proximate the distal end 126 of the second edge 112. In other words, the intensity of the light generated by the supplemental light source 108 is lower near the proximal end 128 of the second edge 112 and higher near the distal end 126 of the second edge 112. In another embodiment, the spacing of the light sources 104 can be varied to provide a desired apodization gradient. For example, in one embodiment, the constituent light sources 130 may be placed closer to one another near the center of the second edge 112 and farther from one another near the ends 126 and 128, thereby providing a higher intensity proximate the center of the edge 112.

Because light injected from the primary light source 106 undergoes depletion as it travels through the waveguide 102, particularly when there are active pixels (i.e., open pixels), the gradient introduced by the supplemental light source 108 may be configured to directly compensate for the active pixel light depletion as a function of distance from the primary light source 106. Since the majority of the light is still present in regions of the waveguide close to the primary light source 106, contributions from the orthogonally-disposed second edge 112 may not be significant near the proximal end 128 of the waveguide 102. However, toward the middle and/or the far end (e.g., the third edge 114) of the slab waveguide 102 the depletion of light flux becomes more significant, and, thus, higher intensity compensation from the light injected from the supplemental light source 108 is desirable in order to achieve uniform luminosity.

In such an embodiment, therefore, the primary light source 106 may provide isotropic insertion flux along the first edge 110, and the secondary light source 108 may be configured to impose an intensity gradient along the second edge 112. The direction of the gradient, in some embodiments, is such that flux intensity increases as a function of distance from the point where the companion light sources 104 (primary 106 and supplemental 108) meet. In other words, the intensity gradient along the second edge 112 increases as a function of distance from the proximal end 128 of the second edge 112 to the distal end 126 of the second edge 112. In the previously discussed embodiment, wherein the spacing between constituent light sources 130 is varied to provide a desired intensity gradient, the superposition of the two luminosity distributions (the summation of the flux distributions from both the isotropic primary light source 106 and the apodized supplemental light source 108) exhibits an improved luminosity distribution of the light emitted by the "on" pixels (i.e., active pixels) across the waveguide 102.

In another embodiment, apodization may be applied to both the primary and supplemental light sources 106 and 108. In other words, the intensity of the light injected into waveguide 102 is varied along the first edge 110 and the second edge 112. Similar to the previously discussed embodiments, the intensity of light injected into the waveguide 102 near the vertex 120 and the proximal ends 124 and 128 may be lower than the intensity of light injected proximate the distal ends 122 and 126 of the edges 110 and 112, respectively. The variations in intensity may be provided due to the spatial density of light sources in a manner similar to those discussed above. Such an embodiment may exhibit improved performance that delivers a more uniform luminosity distribution across the waveguide 102 when the pixels are active.

Figure 5:
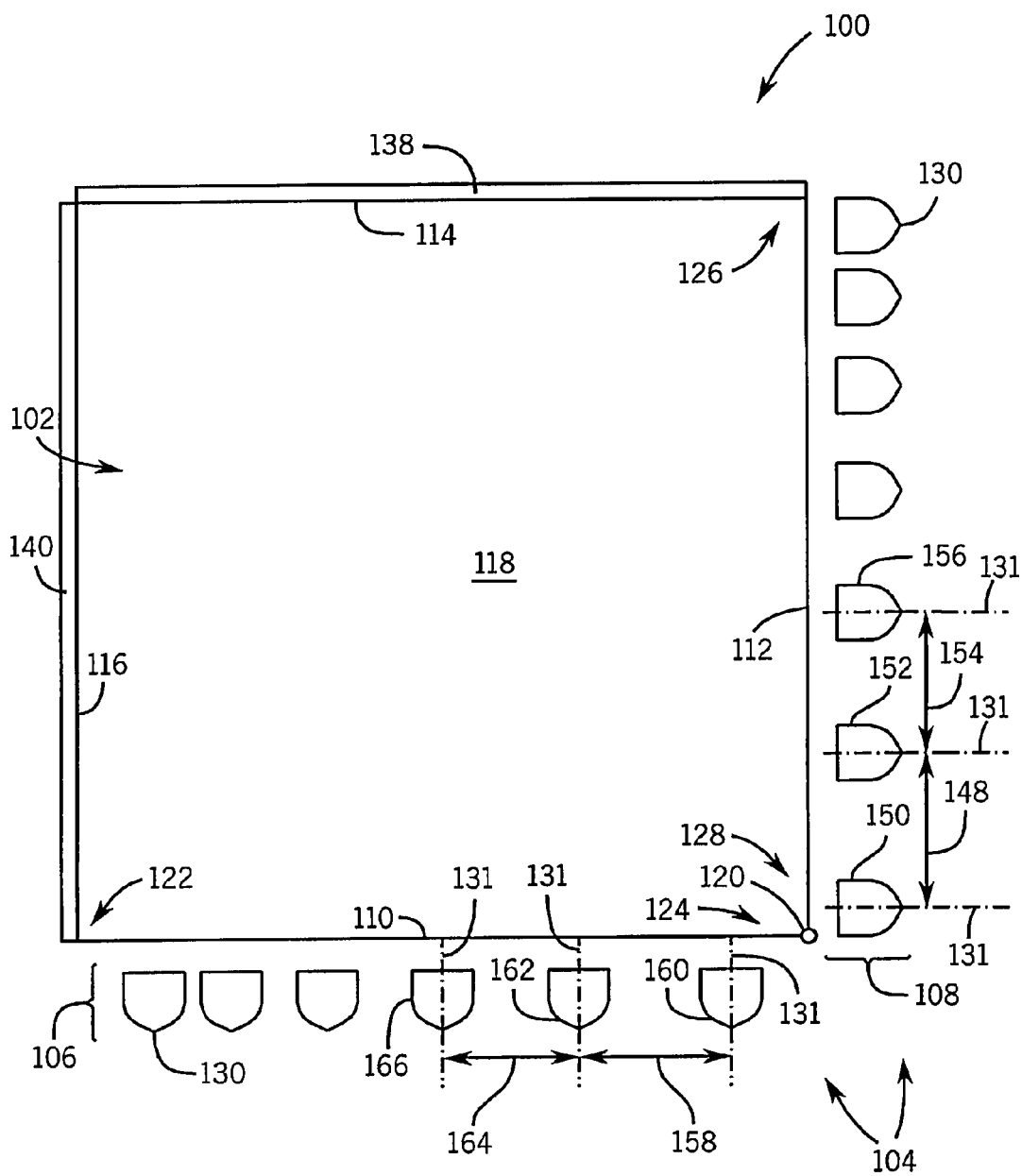
FIG. 5 illustrates a top view of a flat panel display system employing apodized companion light sources in accordance with certain embodiments of the present technique.

FIG. 5 illustrates an embodiment of the system 100 wherein both of the companion light sources 104 are apodized. More specifically, the illustrated embodiment includes variations in the spacing of the constituent light sources 130 of both the primary light source 106 and the supplemental light source 108. As depicted, the distance between the constituent light sources 130 is reduced along the length of the first edge 110 from the vertex 120 to the distal end 122, and is reduced along the length of the second edge 112 from the vertex 120 to the distal end 126. Similar to the discussion above regarding the spacing of the constituent light sources 130 of the supplemental light source 108, the primary light source 106 may include a first distance 158 between a first constituent light source 160 (located proximate the proximal end 124 of the first edge 110) and a second constituent light source 162 that is greater than or equal to a second distance 164 between the second constituent light source 162 and a third constituent light source 166 (that is closer to the distal end 122 of the first edge 110). As illustrated, the distance between each successive pair of constituent light sources 130 is the same or less than the distance between pairs of constituent light sources 130 located closer to the proximal end 124 and/or the vertex 120. Accordingly, the illustrated embodiment includes an intensity gradient of injected light that increases along the first edge 110 and the second edge 112 as a function of distance from the vertex 120. Similar to the embodiments discussed above, the spacing of the light sources 104 can be varied in any manner to provide a variety of apodization gradients. For example, in one embodiment, the constituent light sources 130 may be placed closer to one another near the center of the second or first edge 112 or 110 and farther from one another near the ends 122, 124, 126 and 128, thereby providing a higher intensity proximate the center of the edge(s) 110 or 112.

In the previously discussed embodiments, apodization was achieved by spatially redistributing the individual constituent light sources 130 of the primary light source 106 and/or the supplemental light source 108. However, other embodiments may employ alternate techniques for achieving apodization. For example, turning now to FIG. 6, one embodiment of the present technique includes achieving apodization by directly adjusting the intensity of the respective constituent light sources 130. Such a technique may be employed with the constituent light sources 130 of the primary light source 106 and/or the constituent light sources 130 of the supplemental light source 108 arranged in an equidistant spacing or a varied spacing, as discussed previously. For example, in one embodiment, the power or current supplied to each of the constituent light sources 130 may be adjusted to provide lower flux and/or light intensity near the vertex 120, and higher flux and/or light intensity at the distal ends 122 and 126.

Figure 6:
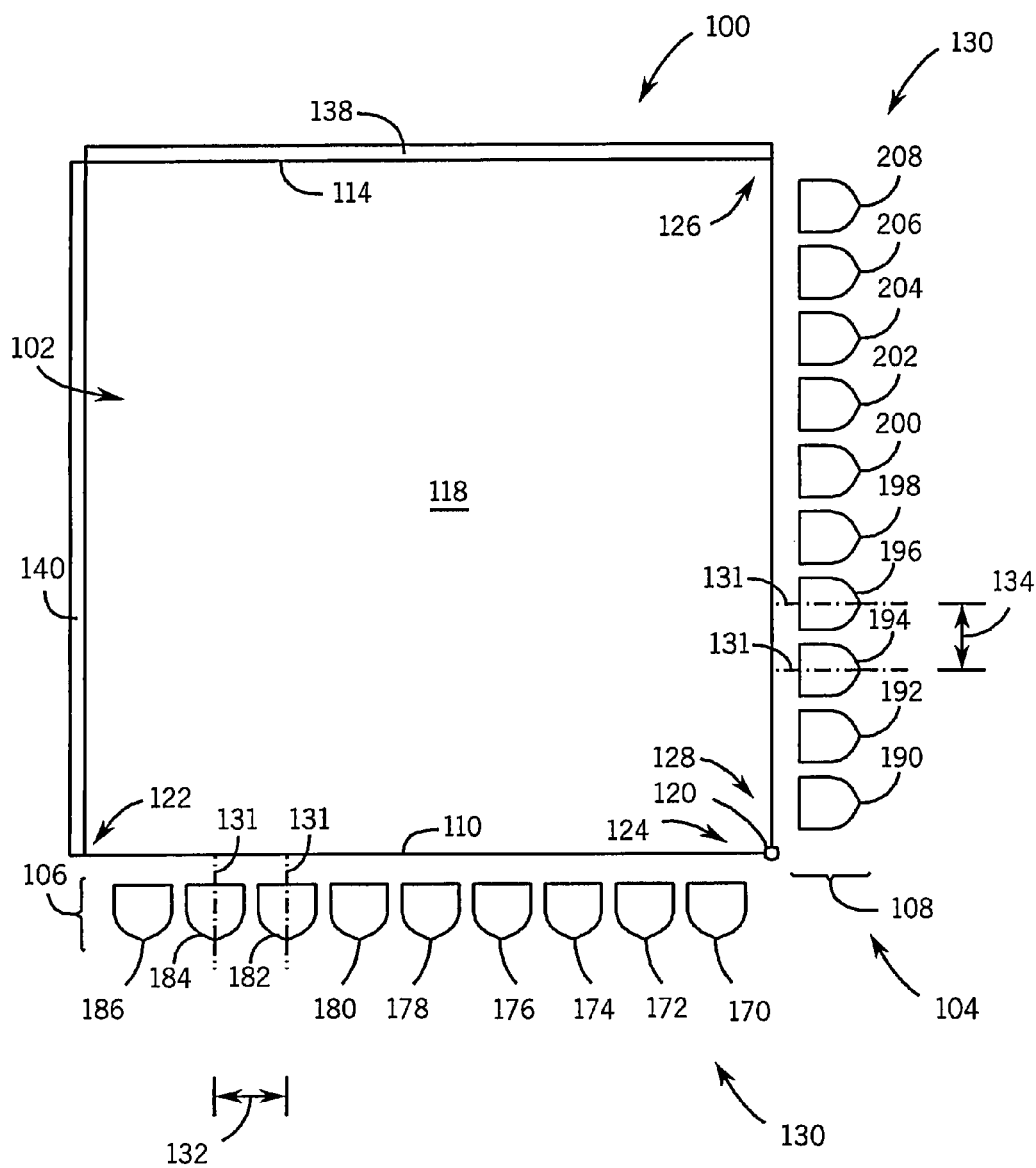
FIG. 6 illustrates a top view of a flat panel display system employing apodized companion light sources in accordance with certain embodiments of the present technique.

In one embodiment, the system 100 of FIG. 6 may be configured to vary the flux injected into the waveguide 102 by varying the intensity of the light emitted by each of the constituent light sources 130. In the illustrated embodiment, the primary light source 106 and the supplemental light source 108 includes a plurality of constituent light sources 170, 172, 174, 176, 178, 180, 182, 184, 186, 190, 192, 194, 196, 198, 200, 202, 204, 206 and 208 that are each arranged in an equidistant configuration, similar to the arrangement discussed with regard to FIG. 3. To provide a monotonically increasing light intensity gradient having a higher light intensity near the distal ends 122 and 126 of the first edge 110 and the second edge 112, respectively, the intensity of each constituent light source 130 may be greater than or equal to the intensity of an adjacent constituent light source 130 located closer to the vertex 120. For example, with respect to the primary light source 106, the intensity of the second constituent light source 172 may be greater than or equal to the intensity of the first constituent light source 170 adjacent the vertex 120, the intensity of the third constituent light source 174 may be greater than or equal to the intensity of the second constituent light source 172, and so forth. Similarly, with respect to the secondary light source 108, the intensity of the second constituent light source 192 may be greater than the intensity of the first constituent light source 190 adjacent the vertex 120, the intensity of the third constituent light source 194 may be greater than the intensity of the second constituent light source 192, and so forth. Although this embodiment demonstrates a monotonically increasing light intensity with increasing distance from the vertex 120, optimal apodization for a given display often departs from a monotonically increasing function. For example, similar to the embodiment discussed above, the intensity of the constituent light sources 130 can be varied in any manner to provide a variety of apodization gradients. For example, in one embodiment, the constituent light sources 130 near the center of the second or first edge 112 or 110 may employ higher intensities and the constituent light sources 130 near the ends 122, 124, 126 and 128 may employ lower intensities, thereby providing a higher intensity proximate the center of the edge(s) 110 or 112. As such, the variation in light intensity of each constituent light source 130 may be controlled by varying the power and/or current supplied to each constituent light source 130. For example, one embodiment may include the addition of resistors in series with each constituent light source 130 to control the delivered power and/or current. Although the illustrated embodiment includes equally spaced constituent light sources 130, other embodiments may include other configurations, such as constituent light sources with unequal (e.g., varied) spacing such as illustrated in FIGS. 4 and 5.

Another embodiment of the present technique may realize apodization of the injected light by applying pulse width modulation to at least one of the companion light sources 104. Generally, in image generation, visibly perceivable colors may be generated from the combination of one or more light sources that are activated or deactivated for a given period of time to provide a given light intensity at a pixel location. Further, each of the one or more light sources may include different wavelengths of light (e.g., color) that are perceived in combination with the light generated as a single color. For example, where a pixel includes a red pixel, a light source having a red wavelength may be activated for 60 ms, while another light source (e.g., light sources having blue and green wavelengths) may be activated for a shorter period, such as 20 ms. Accordingly, in generating a pixel, the light sources may have high frequency duty cycles that can be continuously varied to provide a given color and intensity of light. In one embodiment of the present technique, the duty-cycle of each of constituent light sources 130 may be varied to regulate the intensity of the light emitted by each of the constituent light sources 130. Thus, the light ejected at the pixel locations may be varied (e.g., varied in color and intensity) by adjusting the duty-cycle of the light injected into the waveguide 12 as the pixels are activated. In certain embodiments, the intensity of the individual constituent light sources 130 may be reduced by decreasing the duty-cycle, and the intensity may be increased by increasing the duty-cycle. Thus, to provide an intensity gradient that increases from the proximal ends 124 and 128 to the distal ends 122 and 126 of the first edge 110 and/or the second edge 112, respectively, the constituent light sources 130 near the vertex 120 may employ a duty-cycle that is shorter than the duty-cycle of the constituent light sources 130 near the distal ends 122 and 126 of the companion light sources 104. For example, in an embodiment similar to that illustrated in FIG. 6, to provide an intensity gradient that includes a higher light intensity near the distal ends 122 and 126 of the first edge 110 and the second edge 112, respectively, the duty-cycle of each constituent light source 130 may be greater than or equal to the duty-cycle of the adjacent constituent light source 130 located closer to the vertex 120. For example one constituent light source 130 may have a 60 ms duty cycle, and another of the constituent light sources 130 may have a duty-cycle of only 48 ms. In other words, with respect to the primary light source 106, the duty-cycle of the second constituent light source 172 may be greater than or equal to the duty-cycle of the first constituent light source 170 adjacent the vertex 120, the duty-cycle of the third constituent light source 174 may be greater than or equal to the duty-cycle of the second constituent light source 172, and so forth. Similarly, with respect to the secondary light source 108, the duty-cycle of the second constituent light source 192 may be greater than or equal to the duty-cycle of the first constituent light source 190 adjacent the vertex 120, the duty-cycle of the third constituent light source 194 may be greater than or equal to the duty-cycle of the second constituent light source 192, and so forth. Once again, although this embodiment demonstrates a monotonically increasing light intensity with increasing distance from the vertex 120, optimal apodization for a given display often departs from a monotonically increasing function. For example, similar to the embodiment discussed above, the intensity of the constituent light sources 130 can be varied via the variations in the duty-cycle to provide different apodization gradients. For example, in one embodiment, the constituent light sources 130 near the center of the second or first edge 112 or 110 may employ longer duty cycles, and the constituent light sources 130 near the ends 122, 124, 126 and 128 may employ shorter duty cycles, thereby providing a higher intensity proximate the center of the edge(s) 110 or 112. It may be noted that pulse width modulation may be the preferred embodiment for certain LEDs that suffer chromaticity deviations when either over-powered or under-powered.

Figure 7:
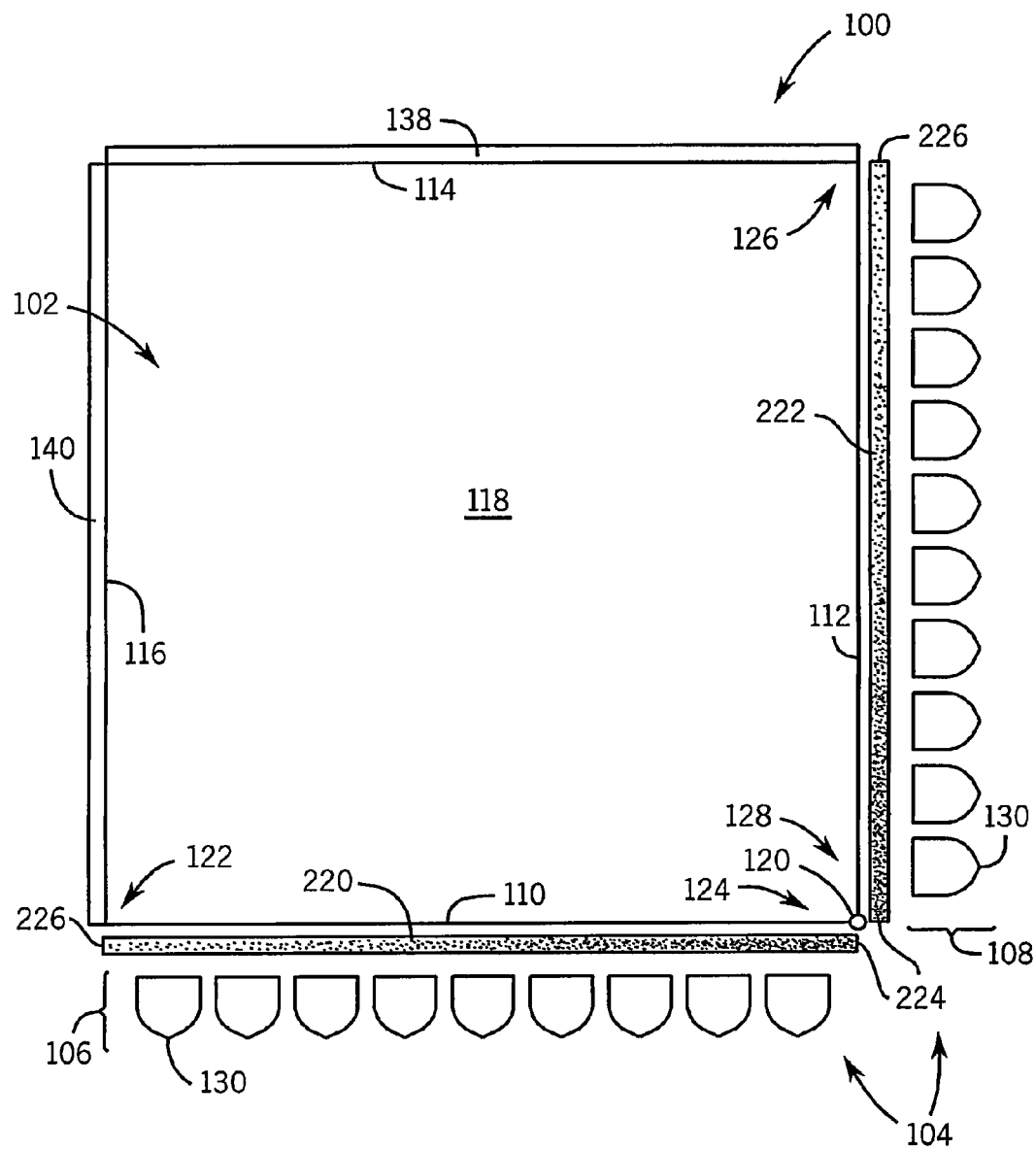
FIG. 7 illustrates a top view of a flat panel display system employing companion light sources having respective filters in accordance with certain embodiments of the present technique.

Another embodiment of the present technique may include implementing a filter or similar light absorbing or scattering device to vary the intensity of the light injected into the edges 110 and 112 of the waveguide 102. For example, FIG. 7 illustrates an embodiment that includes filters 220 and 222 disposed in the path of the light emitted by primary light source 106 and the supplemental light source 108. As depicted, one of the filters 220 is disposed between the primary light source 106 and the first edge 110 of the waveguide 102, and the other filter 222 is disposed between the supplemental light source 108 and the second edge 112 of the waveguide 102.

To provide an intensity gradient along the edges 110 and 112, the filters 220 and 222 may include variations along their lengths. For example, the filters 220 and 222 may include variations from a proximal end 224 to a distal end 226 that regulate the amount of light that is passed through the filters 220 and 222 and into the waveguide 102. In one embodiment, the filters 220 and 222 may include inserts that include a neutral density filter transparent film having a gray-scale gradient imprinted upon the filters 220 and 222. Accordingly, the filters 220 and 222 including the gray-scale gradient film may be disposed between the constituent light sources 130 (which are equidistant and isotropic) such that the darkest (most opaque) portion of the filter gradient is positioned at the proximal ends 224 of the filters 220 and 222 near the constituent light sources 130 adjacent to the vertex 120, and the brightest (most transparent) portion of the filter gradient is situated at the distal ends 226 farthest from the proximal ends 224 and the vertex 120. Again, although this embodiment demonstrates a monotonically increasing light intensity with increasing distance from the vertex 120, optimal apodization for a given display often departs from a monotonically increasing function. For example, similar to the embodiments discussed above, the intensity of the constituent light sources 130 can be varied via one or more filters to provide a variety of apodization gradients. For example, in one embodiment, a portion of the filter 222 or 220 near the center of the second or first edge 112 or 110 may include an increased transparency, and a portion of the filter 222 or 220 near the ends 122, 124, 126 and 128 may include a decreasing transparency, thereby providing a higher intensity proximate the center of the edge(s) 110 or 112. Such an embodiment may permit rapid prototyping and retrofitting for testing various gradients.

Figure 8:
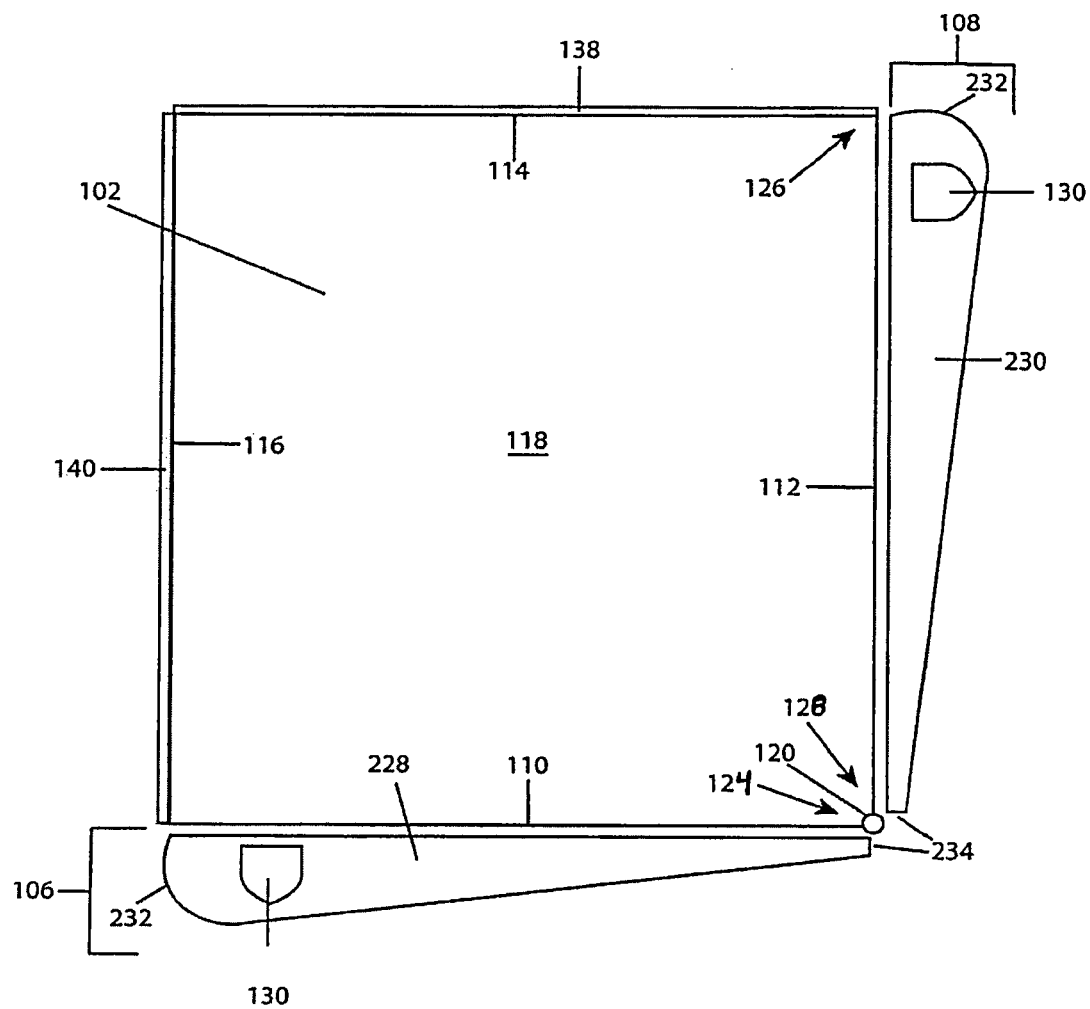
FIG. 8 illustrates a top view of a flat panel display system employing companion light sources having respective light conduits in accordance with certain embodiments of the present technique.

In yet another embodiment, apodization of the light injected into the edges 110 and 112 of the waveguide 102 may be provided via light sources 106 and 108 that each employs a single light source. For example, FIG. 8 depicts an embodiment of the system 100 wherein each of the primary light source 106 and the secondary light source 108 includes a light conduit 228 and 230, respectively. The light conduits 228 and 230 may be employed in place of the plurality of constituent light sources 130 and may apodize the light emitted from one or more light sources. For example, in the illustrated embodiment, the primary and secondary light sources 106 and 108 each include the light conduit 228 or 230, and a single constituent light source 130 disposed at a distal end 232 of the light conduit 228 or 230. Although the illustrated embodiment depicts the single constituent light source 130 disposed crosswise to the length of the conduit 228 or 230, other embodiments may include disposing the single constituent light source 130 parallel to or in partial alignment with the conduit 228 or 230. Further, suitable optics can insure the requisite apodization to achieve the desired luminous uniformity.

In operation, light generated by the light source 130 may be directed along the length of the conduit 228 or 230 from the distal end 232 to a proximal end 234 near the vertex 120. As the light travels through the conduit 228 and 230, the intensity of the light decreases as it approaches the proximal end 234, thereby apodizing the light that is injected along the length of the edges 110 and 112, respectively. For example, in embodiment, the conduit 228 and 230 includes a reflecting and/or scattering surface, and/or is shaped to tailor the amount of light redirected into and out of the conduit 228 and 230. Thus, the conduit 228 and 230 may include a surface or shape that is conducive to redirecting light in accordance with the desired apodization gradient along the edge. In one embodiment, the effect of apodization can be realized with only one constituent light source 130 per edge 110 or 112 (one light source for the primary light source 106, and one for the supplemental light source 108). Further, although this embodiment demonstrates a monotonically increasing light intensity with increasing distance from the vertex 120, optimal apodization for a given display often departs from a monotonically increasing function. For example, similar to the embodiments discussed above, the intensity of the constituent light sources 130 can be varied via one or more conduits to provide a variety of apodization gradients. For example, in one embodiment, a portion of the conduit 230 or 228 near the center of the second or first edge 112 or 110 may direct a significant amount of light into the waveguide 102, and a portion of the conduit 230 or 228 near the ends 122, 124, 126 and 128 may direct a significant amount of light into the waveguide 102, thereby providing a higher intensity proximate the center of the edge(s) 110 or 112. Further, FIG. 8 illustrates an embodiment that includes conduits 228 and 230; however, other embodiments may not employ the conduits 228 and 230. For example, where the light sources 130 are positioned along the length of the edges 110 and 112, the position of the light source 130, even without the light conduit 228 and 230, may provide apodization of the light along the length of the edges 110 and 112. Accordingly, in one embodiment, one or both of the conduits 228 and 230 may be removed. In such an embodiment, the positioning of the light along the edges 110 and 112 alone may provide for an apodized light profile.

FIG. 9 depicts a detailed embodiment of one of the constituent light sources 25 or 130 that may be employed in the discussed embodiments. As depicted, each of the constituent light sources 130 may include a plurality of light emitters 242, 244, and 246 configured to provide varying wavelengths of light. For example, the light emitters 242, 244, and 246 may include red, green, and blue light emitting diodes (LED's), respectively. In other embodiments, the emitters 242, 244, and 246 may include any light source suitable for generating and/or projecting light of a desired wavelength. The emitters 242, 244 and 246 can include independent/individual light source operated in coordination with the other emitters to generate a desired wavelength of light. In one embodiment, the emitters 242, 244 and 246 may be provided by a single light source operated in a manner to generate the desired wavelengths of light. In another embodiment, the emitters 242, 244 and 246 include a plurality of discrete red, green, and blue LED units interleaved to form an array of independent LED units.

In operation the emitters 242, 244, and 246 may be separately controlled, thereby enabling field sequential color generation. In other words, the emitters 242, 244, and 246 may be illuminated in sequence to provide a pattern of light and/or color. In one embodiment, the pattern of light generation may include a first time period in which the first emitter 242 is illuminated to produce a red light, followed by a second time period in which the second emitter 144 is illuminated to produce a green light, followed by a third time period in which the third emitter 146 is illuminated to produce a blue light. In operation, this sequence may be repeated continuously to edge inject a pattern of red, green, and blue light into the waveguide 102. In some embodiments, there may be an off-state interposed between the respective primary colors, or the colors may be temporarily weighted to correspond to the different bit weights of a given color being assembled from binary-encoded pulse widths (e.g., pulse duration is arranged in exponential powers of 2 to correspond to the binary words used to express a gray scale value for a given primary). The repetition of the various red light, green light and blue light may be perceived by a viewer as a single color defined by the ratios of red, green, and blue light used to create the pattern of light. Employing such a technique makes it possible for a pixel to be generated from a single location. In other words, a single point can be cycled through the various patterns and enable the point to be perceived as a single colored pixel (e.g., a single pixel or unipixel), as opposed to embodiments (e.g., tricellular pixel systems) that may include spatial additive color that employs several points (e.g., red, green, and blue points) that are proximate to one another and that are cycled in coordination to create a visually perceived color. The ability to generate a pixel from a single point may help reduce the overall space required to generate a single pixel, and enable the generation of higher resolution displays in a given area, as well as, reduce the number of control elements required on the display surface. This may improve manufacturing yields by simplifying the display's architecture.

In other embodiments, the specific nature of the apodization gradient (linear, exponential, tuned to the pixel efficiencies present on the display surface, etc.) may be adjusted to maximize luminous uniformity, for example when all the pixels are on. These may include different optimization schemes for the present technique, and may include variations intended to tune the performance of any given display system (display length, width, thickness, etc.) to optimize the luminous uniformity of the active pixels.

Turning now to FIG. 10, a table is illustrated that depicts a comparison of illumination and reflective mirroring strategies for various slab waveguide configuration and their impact on luminous uniformity. The table depicts whether or not a given technique (e.g., Methods 1-6) includes a uniform light source (e.g., an isotropic light source), an apodized light source, and/or a reflector (e.g., mirrored surface similar to the far edge 24). The edge 1, edge 2, edge 3 and edge 4 are equivalent to the first edge 110, the third edge 114, the second edge 112, and the fourth edge 116, respectively, for instance. It is important to note that luminous uniformity, tabulated in the two far right columns, is assessed for the case when all pixels are on (activated and emitting light), a circumstance which generally serves as the worst-case scenario to be overcome by compensatory means such as those disclosed herein. As depicted, the implementation of one or more apodized light sources and one or more reflectors helps to improve the luminous uniformity across the waveguide. For example, where only a single uniform light source was employed, the results indicated poor uniformity for both a thick slab waveguide and a thin slab waveguide. Where two adjacent edges employed an apodized light source and opposite edges employed reflectors, the results indicated excellent uniformity for both the thick slab waveguide and the thin slab waveguide.

Further test results validate the results of FIG. 10. For example, one test was conducted using a waveguide system configured in a manner similar to that of FIG. 6, wherein each of the companion light sources 104 included an apodized light source. The waveguide 12 included a length and width of approximately 1.03 inches and a thickness of approximately 0.7 mm. Each of the companion light sources 104 included a plurality of LED's (e.g., constituent light sources 130) distributed along their length. For example, each of the primary light source 106 and the secondary light source 108 included seven LEDs. The normalized intensity of the LEDs from the near end 124 to the distal end 122 of the primary light source 106 were 0.0, 0.3, 0.6, 2.0, 2.3, 2.7 and 0.0, respectively. The normalized intensity of the LEDs from the near end 128 to the distal end 126 of the secondary light source 108 were 0.0, 0.4, 0.8, 2.0, 2.1, 2.6 and 0.0, respectively. The tested configuration reduced a maximum variation from 40% (raw operation without compensation) to 3% (with the present invention deployed as stated), thus yielding a 97% uniformity.

As noted previously, embodiments of the present invention can be implemented on a variety of display systems (e.g., back-lit display systems) that could be expected to use edge-illuminated slab waveguides, associated light-recycling backlight subsystems or FTIR-based display technologies, or a combination thereof. The disclosed embodiments may be highly desirable and lead to improved image generation by system architectures based on such planar illumination architectures.

Figure 11:
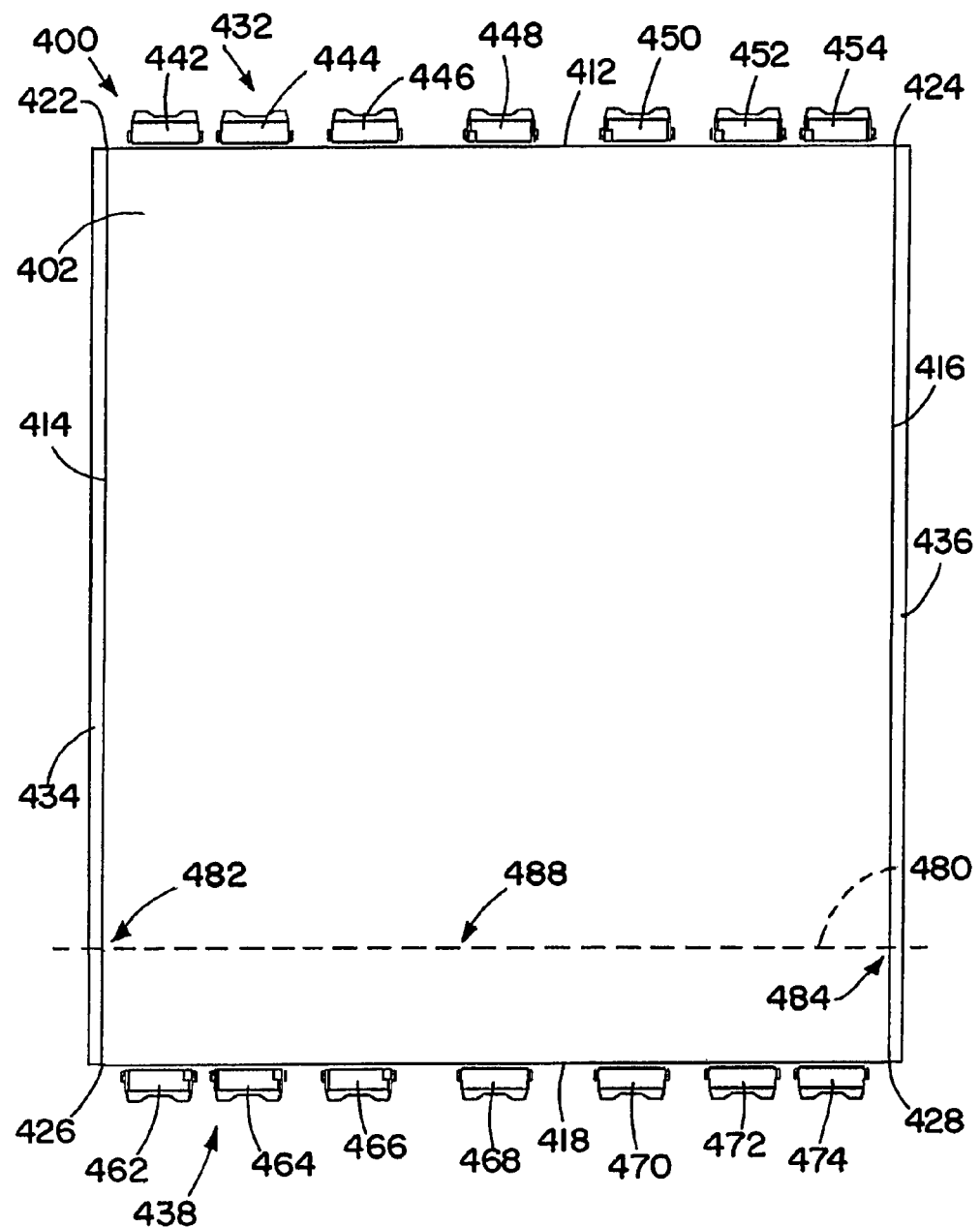
FIG. 11 is a top view of a light system in accordance with another embodiment.

FIG. 11 depicts an example of a light system 400 that includes a waveguide 402. The waveguide 402 is a rectangular waveguide that has a first edge 412, a second edge 414, a third edge 416, and a fourth edge 418. The first edge 412 is parallel to the fourth edge 418, and the second edge 414 is parallel to the third edge 416. In another embodiment the waveguide 402 has a nonrectangular shape. A first vertex 422 is at the intersection between the first and second edges 412 and 414. A second vertex 424 is at the intersection between the first and third edges 412 and 416. A third vertex 426 is at the intersection between the second and fourth edges 414 and 418. A fourth vertex 428 is at the intersection between the third and fourth edges 416 and 418.

A first light source 432 is disposed along the first edge 412. No light source is disposed along the second edge 414. A reflective device 434 is disposed proximal to the second edge 414. In another embodiment the reflective device 434 is omitted. No light source is disposed along the third edge 416. A reflective device 436 is disposed proximal to the third edge 416. In another embodiment the reflective device 436 is omitted. A second light source 438 is disposed along the fourth edge 418.

The first light source 432 includes multiple constituent light sources 442, 444, 446, 448, 450, 452, and 454. The constituent light sources 442-454 may be similar to the constituent light sources described elsewhere herein. According to an embodiment, the constituent light sources are light emitting diodes (LEDs). In the illustrated embodiment, the constituent light sources 442-454 are similar in intensity. The second light source 438 similarly includes multiple light sources 462, 464, 466, 468, 470, 472, and 474.

A uniform spacing of the constituent light sources 442-454 and of the constituent light sources 462-474 would result in a lower intensity of light within the waveguide 402 at locations 482 and 484 along a line 480 parallel to the edge 412 than at a location 488 near the mid-point of the line 480. In the embodiment, the intensity of the light within the waveguide 402 is made more uniform by spacing the constituent light sources 442-454 at non-uniform distances from one another, and by spacing the constituent light sources 462-474 at non-uniform distances from one another. The non-uniform distances between the constituent light sources 442-454 include a maximum distance between adjacent constituent light sources near the center of the first edge 412, and minimum distances between adjacent constituent light sources near the vertices 422 and 424. Similarly, the maximum distance between adjacent constituent light sources 462-474 is near the center of the fourth edge 418, and the minimum distances between adjacent constituent light sources 462-474 are near the vertices 426 and 428. As used herein something is "near" a vertex when it is closer to a vertex than to a center of an edge. Similarly, something is "near" the center of an edge when it is closer to the center of the edge than to a vertex.

In the illustrated embodiment, the minimum distances for first light source 432 are between the two constituent light sources 442 and 444 closest to the vertex 422, and between the two constituent light sources 452 and 454 closest to the vertex 424. Similarly, the minimum distances for second light source 438 are between the two constituent light sources 462 and 464 closest to the vertex 426, and the two constituent light sources 472 and 474 closest to the vertex 428. In other embodiments, the minimum distances are between adjacent ones of the constituent light sources near the vertices other than the first and second constituent light sources from the vertices. In an example, the minimum distances are between the second and third constituent light sources from a vertex. In the example shown, the second and third constituent light sources from the vertices are the constituent light sources 444 and 446, the constituent light sources 452 and 450, the constituent light sources 464 and 466, and the constituent light sources 472 and 470. This may well be the case in embodiments in which the number of constituent light sources is substantially greater than the number illustrated.

In embodiments in which edges 424 and 428 are long enough to accommodate a relatively large number of constituent light sources, the spacing between adjacent ones of the constituent light sources is uniform over most of the length of the edges and decreases only near the vertices.

The pitch variation of the constituent light sources 442-454 and 462-474 provides more uniform intensity by accounting for the fact that the constituent light sources near the center of each edge have their output light supplemented by light from the constituent light sources both to their left and to their right. This is in contrast to the constituent light sources closest to the vertices, which have their output light supplemented by the constituent light sources on one side only (either the left or the right).

The illustrated embodiment shows the light sources 432 and 438 as comprised of respective constituent light sources 442-454 and 462-474 with different spacing between them. In an alternative embodiment the light sources comprise constituent light sources with different respective intensities, for example with minimum intensities near centers of edges, and maximum intensities near the vertices. This is analogous to the embodiment shown in FIG. 6 and described above. In another alternative embodiment, the light sources include filters placed between constituent light sources and their respective edges of the waveguide. Each filter has less transmissivity near the center of the respective edge, and more transmissivity near the vertices. This is analogous to the embodiment shown in FIG. 7 and described above. In yet another alternate embodiment each light source includes a respective light conduit disposed along the respective edge of the waveguide. The conduit is configured to provide a greater light output near the vertices than near the center of the edge. This is analogous to the embodiment shown in FIG. 8 and described above.

Figure 12:
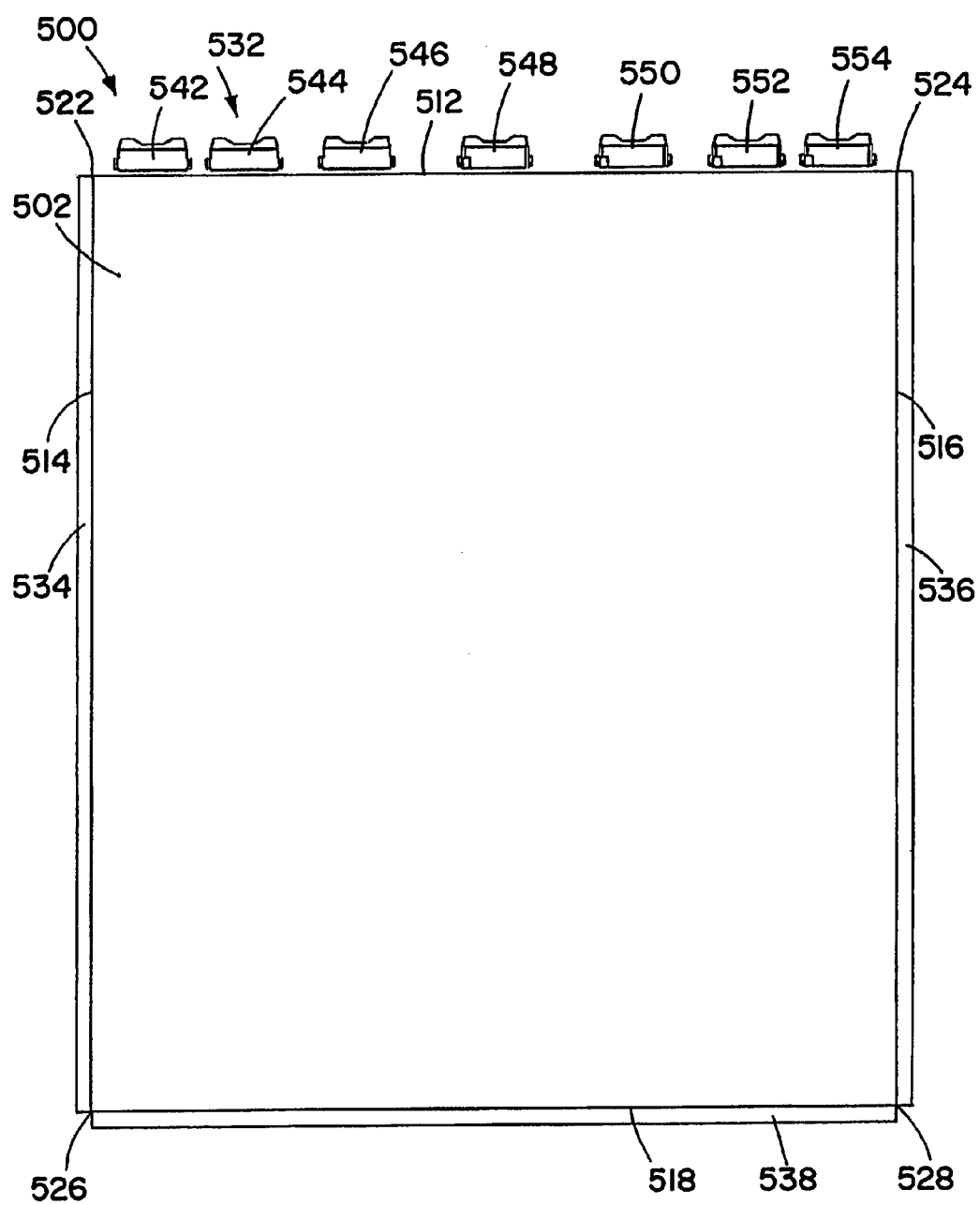
FIG. 12 is a top view of a light system in accordance with still another embodiment.

FIG. 12 shows a light system 500 that is similar to the light system 400 except that the light system 500 has a light source only along one edge. The light system 500 has a waveguide 502 that is a rectangular waveguide that has a first edge 512, a second edge 514, a third edge 516, and a fourth edge 518. The waveguide 502 also has vertices 522, 524, 526, and 528. A first light source 532 includes constituent light sources 542, 544, 546, 548, 550, 552, and 554, disposed along the first edge 512. The constituent light sources 542-554 are spaced in a manner analogous to the spacing of the constituent light sources 442-454 and 462-474 of the light system 400 (FIG. 11), with a minimum spacing near the vertices 522 and 524, and a maximum spacing at the center of the first edge 512.

No light sources are disposed along the other edges 514, 516, and 518. Instead reflective devices 534, 536, and 538 are disposed proximal the edges 514, 516, 518. In another embodiment one or more of the reflective devices 534, 536, and 538 is omitted. Other alternative embodiments described above with regard to the light system 400 (FIG. 11) also apply to the light system 500.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. For example, any of the previously discussed techniques may be employed individually, or in combination to provide the desired performance.

What is claimed is:

1. A light system comprising:
a slab waveguide comprising a first edge and a second edge that intersect at a vertex; and
a light source disposed along at least part of the first edge; wherein:
no light source is disposed along the second edge;
the light source comprises an array of at least four constituent light sources located along an entire distance from the vertex to a center of the first edge; and
each constituent light source in the array located along the entire distance from the vertex to the center of the first edge is separated from each neighboring constituent light source by a spacing distance, each spacing distance larger than the preceding spacing distance located closer to the vertex along the entire distance from the vertex to the center of the first edge.

2. The light system of claim 1, wherein:
the constituent light sources comprise:
a first constituent light source that is nearest to the vertex; and
a second constituent light source that is adjacent to the first constituent light source; and
the minimum distance is between the first constituent light source and the second constituent light source.

3. The light system of claim 1, wherein:
the constituent light sources comprise:
a first constituent light source that is nearest to the vertex;
a second constituent light source that is adjacent to the first constituent light source; and a third constituent light source that is adjacent to the second constituent light source, with the second constituent light source between the first constituent light source and the third constituent light source; and the minimum distance is between the second constituent light source and the third constituent light source.

4. The light system of claim 1, comprising a reflective device disposed proximate to the second edge.

5. The light system of claim 1, wherein:
the vertex is a first vertex;
the waveguide comprises a third edge that intersects the first edge at a second vertex;
no light source is disposed along the third edge; and
the array of constituent light sources progressively increases in distance between one another as a function of distance from the second vertex to the center of the first edge.

6. The light system of claim 5, comprising a reflective device disposed proximate to the third edge.

7. The light system of claim 5, wherein:
the light source is a first light source;
the waveguide additionally comprises a fourth edge that intersects with the second and third edges at third and fourth vertices, respectively; and
the light system additionally comprises a second light source disposed along at least part of the fourth edge.

8. The light system of claim 7, wherein:
the constituent light sources are first constituent light sources;
the second light source comprises second constituent light sources spaced at distances between one another; and
the second constituent light sources near the third and fourth vertices are spaced closer to one another than the second constituent light sources located farther from the third and fourth vertices.

9. The light system of claim 8, wherein the second constituent light sources have a maximum distance between adjacent ones of the second constituent light sources near the center of the fourth edge.

10. The light system of claim 7, wherein the first edge is parallel to the fourth edge.

11. The light system of claim 5, wherein:
the waveguide comprises a fourth edge that intersects both the second edge and the third edge; and
no light source is disposed along the fourth edge.

12. The light system of claim 11, wherein the first edge is parallel to the fourth edge.

13. The light system of claim 11, comprising a reflective device disposed proximate the fourth edge.

14. The light system of claim 1, wherein the constituent light sources comprise light emitting diodes.

15. A light system comprising:
a slab waveguide comprising a first edge, a second edge, and a third edge, the first edge intersecting the second edge and the third edge at respective vertices; and
a light source disposed along the first edge comprising an array of constituent light sources located along an entire distance from one of the respective vertices to a center of the first edge, wherein:
no light source is disposed along the second and third edges; and
each constituent light source in the array located along the entire distance from the one of the respective vertices to the center of the first edge inputs light into the slab waveguide with less intensity than the preceding constituent light source located closer to the one of the respective vertices over the entire distance from the one of the respective vertices to the center of the first edge.

16. The light system of claim 15, wherein each constituent light source in the array located along the entire distance from the one of the respective vertices to the center of the first edge is separated from each neighboring constituent light source by a spacing distance, each spacing distance larger than the preceding spacing distance located closer to the one of the respective vertices along the entire distance from the one of the respective vertices to the center of the first edge.

17. The light system of claim 15, wherein the light source comprises a filter juxtaposed to the first edge that progressively decreases in transmissivity as a function of distance from at least one of the respective vertices to the center of the first edge.

18. The light system of claim 15, wherein each constituent light source in the array located along the entire distance from the one of the respective vertices to the center of the first edge emits light with less intensity than the preceding constituent light source located closer to the one of the respective vertices over the entire distance from the one of the respective vertices to the center of the first edge.

19. The light system of claim 18, wherein the constituent light sources having the lowest intensities are located near the center of the first edge.

20. The light system of claim 15, wherein the constituent light sources comprise light emitting diodes.

21. The light system of claim 17, wherein the constituent light sources all have the same intensity.

22. The light system of claim 15, wherein:
the light source is a first light source;
the waveguide comprises a fourth edge that intersects the second edge and the third edge at respective vertices;
the light system comprises a second light source disposed along at least part of the fourth edge; and
the second light source has a lower intensity near the center of the fourth edge than near the vertices where the fourth edge intersects the second edge and the third edge.

23. The light system of claim 15, wherein:
the waveguide comprises a fourth edge that intersects the second edge and the third edge; and
no light source is disposed along the fourth edge.

24. A method comprising:
providing a waveguide comprising a first edge, a second edge, and a third edge, the first edge intersecting the second edge and the third edge at respective vertices;
edge injecting light into the first edge of the waveguide;
wherein the edge injecting comprises injecting light into the first edge of the waveguide from a light source disposed along the first edge and comprising an array of constituent light sources located along an entire distance from one of the respective vertices to a center of the first edge, each constituent light source in the array located along the entire distance from the one of the respective vertices to the center of the first edge injecting the light into the slab waveguide with less intensity than the preceding constituent light source located closer to the one of the respective vertices over the entire distance from the one of the respective vertices to the center of the first edge.

25. The method of claim 24, wherein:
the waveguide additionally comprises a fourth edge that intersects the second edge and the third edge at respective vertices;
the method additionally comprises edge injecting light into the fourth edge of the waveguide; and the edge injecting into the fourth edge comprises injecting a lower intensity of light near the center of the fourth edge than near the vertices where the fourth edge intersects the second edge and the third edge.

26. The method of claim 25, wherein the first edge and the fourth edge are parallel to each other.

* * * * *